(12) United States Patent
Fort et al.

(10) Patent No.: US 9,069,765 B2
(45) Date of Patent: Jun. 30, 2015

(54) METHOD AND SYSTEM FOR MATCHING OBJECTS HAVING SYMMETRICAL OBJECT PROFILING

(71) Applicants: Pavel A Fort, Westbury, NY (US); Sheau Ng, Wayland, MA (US)

(72) Inventors: Pavel A Fort, Westbury, NY (US); Sheau Ng, Wayland, MA (US)

(73) Assignee: NBCUniversal Media, LLC, New York, NY (US)

( * ) Notice: Subject to any disclaimer, the term of this patent is extended or adjusted under 35 U.S.C. 154(b) by 97 days.

(21) Appl. No.: 13/661,869

(22) Filed: Oct. 26, 2012

(65) Prior Publication Data

US 2014/0122512 A1 May 1, 2014

(51) Int. Cl.
*G06F 17/30* (2006.01)
(52) U.S. Cl.
CPC ...................................... *G06F 17/30* (2013.01)
(58) Field of Classification Search
USPC .................. 707/2, 3, 758; 725/34; 705/37
See application file for complete search history.

(56) References Cited

U.S. PATENT DOCUMENTS

| | | | | |
|---|---|---|---|---|
| 2002/0052825 | A1* | 5/2002 | Bensemana | 705/37 |
| 2011/0185384 | A1* | 7/2011 | Wang et al. | 725/34 |
| 2013/0318085 | A1* | 11/2013 | Pepper | 707/737 |

\* cited by examiner

*Primary Examiner* — Etienne Leroux

(57) ABSTRACT

A system is described that implements symmetrical object profiles across one or more objects, wherein an object profile is influenced by other object profiles with which it interacts. In particular, the system includes a configuration for a first object profile that is associated with a first object, wherein the first object profile comprises a set of attributes having a first set of valuations. The system includes a configuration for a second object profile that is associated with a second object, wherein the second object profile comprises said set of attributes having a second set of valuations. The system includes a profile updater for managing the first object profile and the second object profile, wherein in a transaction involving the first and second objects, corresponding object profiles are updated based on valuations in the first and second set of valuations.

22 Claims, 19 Drawing Sheets

100

| CATEGORY | ATTRIBUTE | | SCORE |
|---|---|---|---|
| GENDER | MALE | 523A | |
| GENDER | FEMALE | 523B | |
| AGE | UNDER 18 | 525A | |
| AGE | 19-25 | 525B | |
| AGE | 26-34 | 525C | |
| AGE | 35-44 | 525D | |
| AGE | 45-54 | 525E | |
| AGE | 55-65 | 525F | |
| AGE | OVER 65 | 525G | |
| GENRE | ACTION | 527A | |
| GENRE | ROMANCE | 527B | |
| GENRE | THRILLER | 527C | |

500 — 510 CATEGORY — 520 ATTRIBUTE — 530 SCORE 513 (GENDER), 515 (AGE), 517 (GENRE)

Score column = 100 PERCENT

FIRST OBJECT 610

| CATEGORY | ATTRIBUTE | SCORE |
|---|---|---|
| GENDER | MALE | 1.000 |
| GENDER | FEMALE | 0.000 |
| AGE | UNDER 18 | 0.000 |
| AGE | 19-25 | 0.000 |
| AGE | 26-34 | 1.000 |
| AGE | 35-44 | 0.000 |
| AGE | 45-54 | 0.000 |
| AGE | 55-64 | 0.000 |
| AGE | OVER 65 | 0.000 |
| GENRE | ACTION | 0.000 |
| GENRE | ROMANCE | 0.000 |
| GENRE | THRILLER | 0.000 |

SECOND OBJECT 650

| CATEGORY | ATTRIBUTE | SCORE |
|---|---|---|
| GENDER | MALE | 0.000 |
| GENDER | FEMALE | 1.000 |
| AGE | UNDER 18 | 0.000 |
| AGE | 19-25 | 0.000 |
| AGE | 26-34 | 0.000 |
| AGE | 35-44 | 0.000 |
| AGE | 45-54 | 0.000 |
| AGE | 55-64 | 0.000 |
| AGE | OVER 65 | 0.000 |
| GENRE | ACTION | 0.500 |
| GENRE | ROMANCE | 0.000 |
| GENRE | THRILLER | 0.500 |

CONSUMER – A (2 TRANSACTIONS) — 710A

| CATEGORY | ATTRIBUTE | OLD SCORE | NEW SCORE |
|---|---|---|---|
| GENDER | MALE | 1.000 | 1/2 = 0.500 |
| GENDER | FEMALE | 0.000 | 1/2 = 0.500 |

715A, 717A

ASSET X (2 TRANSACTIONS) — 720

| CATEGORY | ATTRIBUTE | OLD SCORE | NEW SCORE |
|---|---|---|---|
| GENDER | MALE | 0.000 | 1/2 = 0.500 |
| GENDER | FEMALE | 1.000 | 1/2 = 0.500 |

725, 727

700B

| CONSUMER – A (3 TRANSACTIONS) | | |
|---|---|---|
| CATEGORY | ATTRIBUTE | OLD SCORE (percent) | NEW SCORE (percent) |
| GENDER | MALE | 0.500 | 1.633/3 = 0.544 |
| GENDER | FEMALE | 0.500 | 1.367/3 = 0.456 |

| ASSET Y (31 TRANSACTIONS) | | |
|---|---|---|
| CATEGORY | ATTRIBUTE | OLD SCORE (percent) | NEW SCORE (percent) |
| GENDER | MALE | 0.633 | 19.49/31 = 0.629 |
| GENDER | FEMALE | 0.367 | 11.51/31 = 0.371 |

CONSUMER – A (4 TRANSACTIONS) — 710C

| CATEGORY | ATTRIBUTE | OLD SCORE (percent) | NEW SCORE (percent) |
|---|---|---|---|
| GENDER | MALE | 0.544 | 2.383/4 = 0.596 |
| GENDER | FEMALE | 0.456 | 1.617/4 = 0.404 |

715C, 717C

ASSET Z (12 TRANSACTIONS) — 740

| CATEGORY | ATTRIBUTE | OLD SCORE (percent) | NEW SCORE (percent) |
|---|---|---|---|
| GENDER | MALE | 0.750 | 8.794/12 = 0.732 |
| GENDER | FEMALE | 0.250 | 3.206/12 = 0.268 |

745, 747

900B 920　　　　925　　　　930

| Transactions 1 to n, where n = cumulative # of transactions | Compound Object Profile | | | Current profile of object that was previously consumed | | |
|---|---|---|---|---|---|---|
| 1 | Cat. | Attribute | Score | Cat. | Attribute | Score |
| | Gender | Male | 0.500 | Gender | Male | 0.500 |
| | Gender | Female | 0.500 | Gender | Female | 0.500 |
| | Age | Under 18 | 0.600 | Age | Under 18 | 0.600 |
| | Age | 19-25 | 0.100 | Age | 19-25 | 0.100 |
| | Age | 26-34 | 0.100 | Age | 26-34 | 0.100 |
| | Age | 35-44 | 0.100 | Age | 35-44 | 0.100 |
| | Age | 45-54 | 0.100 | Age | 45-54 | 0.100 |
| | Age | 54-65 | 0.000 | Age | 54-65 | 0.000 |
| | Age | Over 65 | 0.000 | Age | Over 65 | 0.000 |
| | Genre | Action | 0.333 | Genre | Action | 0.333 |
| | Genre | Romance | 0.334 | Genre | Romance | 0.334 |
| | Genre | Thriller | 0.333 | Genre | Thriller | 0.333 |

FIG. 9B

| Transactions 1 to n, where n = cumulative # of transactions | Compound Object Profile | | | Current profile of object that was previously consumed | | |
|---|---|---|---|---|---|---|
| 2 | Cat. | Attribute | Score | Cat. | Attribute | Score |
| 943 | Gender | Male | 0.300 | Gender | Male | 0.100 |
| | Gender | Female | 0.700 | Gender | Female | 0.900 |
| | Age | Under 18 | 0.350 | Age | Under 18 | 0.100 |
| | Age | 19-25 | 0.150 | Age | 19-25 | 0.200 |
| | Age | 26-34 | 0.200 | Age | 26-34 | 0.300 |
| | Age | 35-44 | 0.150 | Age | 35-44 | 0.200 |
| | Age | 45-54 | 0.100 | Age | 45-54 | 0.100 |
| | Age | 54-65 | 0.050 | Age | 54-65 | 0.100 |
| | Age | Over 65 | 0.000 | Age | Over 65 | 0.000 |
| | Genre | Action | 0.417 | Genre | Action | 0.500 |
| | Genre | Romance | 0.417 | Genre | Romance | 0.500 |
| | Genre | Thriller | 0.166 | Genre | Thriller | 0.000 |

| Category | Attribute | Score |
|---|---|---|
| Gender | Male | 1.000 |
| Gender | Female | 0.000 |
| Age | Under 18 | 0.000 |
| Age | 19-25 | 0.500 |
| Age | 26-34 | 0.500 |
| Age | 35-44 | 0.000 |
| Age | 45-54 | 0.000 |
| Age | 54-65 | 0.000 |
| Age | Over 65 | 0.000 |
| Genre | Action | 0.333 |
| Genre | Romance | 0.333 |
| Genre | Thriller | 0.333 |

1120 → Gender rows
1123 → Male row
1125 → Female row
1130 → Age rows
1133 → 19-25 row
1135 → 26-34 row
1140 → Genre rows

| Possible Inferred Compound Objects (i.e. Test Object) | | | |
|---|---|---|---|
| 1 | Object 1 | Object 2 | Object 3 |
| 2 | Object 2 | Object 3 | Object 4 |
| 3 | Object 3 | Object 4 | Object 5 |
| 4 | Object 4 | Object 5 | Object 6 |
| 5 | Object 5 | Object 6 | Object 7 |
| 6 | Object 6 | Object 7 | Object 8 |
| 7 | Object 7 | Object 8 | Object 9 |
| ... | ... | ... | ... |
| 120 | Object 8 | Object 9 | Object 10 |

FIG. 11B

| Category | Attribute | Consumer A | Product X | Product Y | Product Z | Var Product X | Var Product Y | Var Product Z |
|---|---|---|---|---|---|---|---|---|
| Gender | Male | 0.596 | 0.467 | 0.599 | 0.79 | 0.129 | 0.003 | 0.194 |
| Gender | Female | 0.404 | 0.533 | 0.401 | 0.21 | 0.129 | 0.003 | 0.194 |
| Age | Under 18 | 0.1 | 0.2 | 0.8 | 0 | 0.1 | 0.7 | 0.1 |
| Age | 19-25 | 0.12 | 0.4 | 0.1 | 0.1 | 0.28 | 0.02 | 0.02 |
| Age | 26-34 | 0.13 | 0.1 | 0.05 | 0.2 | 0.03 | 0.08 | 0.07 |
| Age | 35-44 | 0.5 | 0.1 | 0.05 | 0.1 | 0.4 | 0.45 | 0.4 |
| Age | 45-54 | 0.15 | 0 | 0 | 0.1 | 0.15 | 0.15 | 0.05 |
| Age | 54-65 | 0 | 0.2 | 0 | 0.2 | 0.2 | 0 | 0.2 |
| Age | Over 65 | 0 | 0 | 0 | 0.3 | 0 | 0 | 0.3 |
| Genre | Action | 0.3 | 0.1 | 0 | 0.75 | 0.2 | 0.3 | 0.45 |
| Genre | Romance | 0.3 | 0.9 | 0.5 | 0.1 | 0.6 | 0.2 | 0.2 |
| Genre | Thriller | 0.4 | 0 | 0.5 | 0.15 | 0.4 | 0.1 | 0.25 |
| | | | | | Cum Var: | 2.618 | 2.006 | 2.428 |

METHOD AND SYSTEM FOR MATCHING OBJECTS HAVING SYMMETRICAL OBJECT PROFILING

CROSS-REFERENCE TO RELATED APPLICATION

The present application is related to concurrently filed U.S. patent application Ser. No. 13/661,736, entitled "METHOD AND SYSTEM FOR SYMMETRICAL OBJECT PROFILING FOR ONE OR MORE OBJECTS,", filed on Oct. 26, 2012, which is incorporated by reference in its entirety.

BACKGROUND

There are increasing numbers of distribution channels for connecting consumers with other items (e.g., products, services, content, information, etc.). For instance, the internet facilitates a communication network that joins millions of computers together. Through these distribution channels, users are able to access and search for information, make purchases of products, send and receive electronic mail, etc. As such, the internet and other distribution channels have become commonplace in the lives of the general populace.

Given these distribution channels, technology has evolved to help facilitate matching objects together, such as, the connection of a user with possibly desired items. For instance, targeting, as a form of matching, is used to connect or match various objects together, such as, advertisements and users). In practice, the delivery of advertisements to targeted users is an established technology that takes advantage of the distribution channels, wherein the advertisements are targeted to users exhibiting particular traits. In general, traits can include demographic, psychographic, consumer histories, and other user activities that help categorize or define a user. Further, traits may be compiled into a user profile that is specific to a particular user, wherein user profiles and the information contained within are used for targeting. Generally, an advertisement may be matched or targeted to a user profile exhibiting certain characteristics.

Unfortunately, there are many shortcomings to the targeting of items (e.g., advertising) to a particular group of users. These shortcomings lead to inefficient and non-effective targeting or matching. For instance, targeting relies heavily on the accuracy of the information contained within a user profile, and more specifically how accurately does that information define the particular user. However, user and object profiles suffer from various deficiencies that decrease the effectiveness of targeting.

As an example of the deficient use of user of user profiles for targeting, user profiles may contain inaccurate registration information, wherein a user may lie or misreport information used for identification in an effort to preserve privacy, or a general lack of desire to accurately define his or her interests. Also, user profiles and content tend to be static, wherein the information contained within a user profile does not change after its initial registration. A static profile does not accurately reflect the evolving interests of a user over time. Further, a user profile may not contain enough information to be used in the targeting process. This is especially true when a profile is first created. In that case, no targeting can occur until enough information is established in that profile. Moreover, user profiles that do no match any particular grouping of profiles used for targeting may never be selected for targeting. That is, if a profile falls outside the boundaries of characteristics defining one or more grouping of user profiles, that user profile will never be selected as a target for the delivery of advertising and/or other content.

It is desirous to have profiles that contain accurate and up-to-date information for purposes of proper matching and/or targeting of two or more objects.

SUMMARY

In embodiments of the present invention, a system for matching objects together is described that implements symmetrical object profiles across one or more objects, wherein an object profile is influenced by other object profiles with which it interacts. In particular, the system for matching includes a profile updater for managing one or more of a plurality of symmetrical object profiles associated with a plurality of objects. Each of the plurality of symmetrical object profiles comprises a set of attributes, wherein the plurality of objects is associated with a plurality of object types. Additionally, the system includes a first object profile that is associated with a first object of a first object type. The first object profile comprises a first set of valuations for the set of attributes. The system also includes a group of matching objects for purposes of matching with the first object. The group of matching objects is associated with a group of matching object profiles that is selected from the plurality of symmetrical object profiles. At least one matching object from the group is comprised of a second object type. The system also includes a comparator for comparing attributes in the first set of valuations for the first object with attributes in corresponding matching object profiles for the plurality of matching objects. The system also includes a matching module for determining a first matching object profile in the group of matching object profiles that comprises attributes closest to the first set of valuations for the first object. When determined, the matching module matches the first object to the first matching object.

In another embodiment, a method for matching is disclosed. The method is implemented within a system comprising a plurality of objects that is associated with symmetrical object profiles, each comprising a set of attributes. The plurality of objects is associated with a plurality of object types. The method includes accessing from memory a first set of valuations for the set of attributes for a first object profile associated with a first object. The method also includes selecting a group of matching objects from the plurality of objects for purposes of matching, and more specifically for matching with the first object. Each of the group is associated with a corresponding matching object profile. The method also includes comparing attributes, at a comparator, in the first set of valuations with attributes in corresponding matching object profiles of the plurality of matching objects. The method also includes determining a first matching object comprising attributes closest to the first set of valuations for the first object. The method also includes matching the first object to the first matching object based on their association of attribute valuations.

In some embodiments, a non-transitory computer-readable storage medium is disclosed having stored thereon, computer-executable instructions that, when executed causes the computer system to perform a method for matching one or more objects together. The method is implemented within a system comprising a plurality of objects that is associated with symmetrical object profiles, each comprising a set of attributes. The plurality of objects is associated with a plurality of object types. The method includes accessing from memory a first set of valuations for the set of attributes for a first object profile associated with a first object. The method also includes selecting a group of matching objects from the plurality of objects for purposes of matching, and more specifically for matching with the first object. Each of the group is associated with a corresponding matching object profile. The method also includes comparing attributes, at a comparator, in the first set of valuations with attributes in corresponding matching object profiles of the plurality of matching objects. The method also includes determining a first matching object comprising attributes closest to the first set of valuations for the first object. The method also includes matching the first object to the first matching object based on their association of attribute valuations.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 5 is an illustration of a symmetrical object profile, in accordance with one embodiment of the present disclosure.

FIG. 6 is an illustration of the seeding of attribute valuations in two objects within a system configured for implementing symmetrical object profiles across one or more objects, wherein an object profile is influenced by other object profiles with which it interacts, in accordance with one embodiment of the present disclosure.

FIG. 7A is an illustration of a first state of an object profile of a consumer after an interaction with ASSET-X within a history of interactions involving the consumer, in accordance with one embodiment of the present disclosure.

FIG. 7B is an illustration of a second state of an object profile of a consumer after an interaction with ASSET-Y within a history of interactions involving the consumer, in accordance with one embodiment of the present disclosure.

FIG. 7C is an illustration of a third state of an object profile of a consumer after an interaction with asset-Z within a history of interactions involving the consumer, in accordance with one embodiment of the present disclosure.

FIG. 9B is a table illustrating state of a declared compound object profile of FIG. 9A after a single transaction, in accordance with one embodiment of the present disclosure.

FIG. 9C is a table illustrating state of a declared compound object profile of FIG. 9A after a second transaction, in accordance with one embodiment of the present disclosure.

FIG. 11A is a table illustrating an initial state of specified attributes for a compound, inferred object profile, in accordance with one embodiment of the present disclosure.

FIG. 11B is a table illustrating a list of all possible member object combinations for a given size of a compound, inferred object, in accordance with one embodiment of the present disclosure.

FIG. 14 is a table illustrating the determination of variances between attribute values for corresponding object profiles when matching a first object to one or more objects in a group of matching objects, in accordance with one embodiment of the present disclosure.

DETAILED DESCRIPTION

Figure 1:
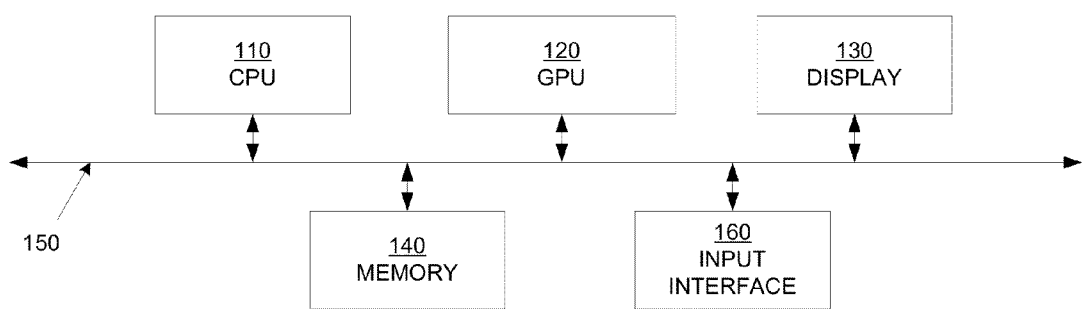
FIG. 1 depicts a block diagram of an exemplary computer system suitable for implementing the present methods, in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "establishing," "determining," "accessing," "updating," "selecting," "comparing," "matching," or the like, refer to actions and processes (e.g., flowcharts 4, 8, 10, and 13 of FIGS. 4, 8, 10, and 13, respectively) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Accordingly, embodiments of the present invention provide for a system including symmetrical profiles for all objects and all object types to give more accurate reflections of relationships between the objects based on their interactions with each other. Other embodiments provide the above accomplishments and further provide for profiles that are updatable based on profile information for objects with which it interacts. Still other embodiments provide for object profiles that reflect the shading or fluidity of behavioral characteristics instead of being limited to absolute asset descriptions for those behavioral characteristics. Other embodiments provide a quick start to object profiles having no transactions or a minimal amount of transactions such that they are immediately useful, by populating asset valuations in a new object profile through seeding or absorption of profiles of other objects. Still other embodiments provide for self correcting object profiles that are able to minimize the effect of faulty profile information quickly within a few subsequent transactions. Further, other embodiments provide for matching of object profiles in a system with up-to-date symmetrical profiles for objects comprised of multiple object types.

Symmetrical Object Profiling

Embodiments of the present invention are described within the context of managing object profiles for various purposes.

However, other embodiments support object profiles that are managed and implemented outside of a web-based system for various purposes. More specifically, information contained within object profiles are used to understand characteristics of objects (e.g., consumers) to deliver and/or suggest appropriate advertisements, content, and user experiences. Also, once characteristics are defined for each object, information contained within object profiles are used to match two or more objects to each other (e.g., matching an object with an advertisement, asset, experience, etc). Further, information contained within object profiles are used to perform analytics for a variety of commercial, educational, and political reasons, to name a few.

In embodiments of the present invention, an object profile includes psychographic information used for defining a corresponding object or grouping of objects. The psychographic information describes behavioral characteristics, such as, those for a consumer or group of consumers, and describes its or their attitudes, perceptions, and behaviors. In general, psychographic information provides insight into the personality, values, attitudes interests and lifestyles of a corresponding object or grouping of objects.

Additionally, an object profile includes other types of information, including demographic information in other embodiments. For instance, demographic information is used to define the characteristics and statistics of a population of a region. Examples of demographic information include gender, race, age, home ownership, employment status, location, etc. In some instances, psychographic information includes and/or uses demographic information for defining behavioral characteristics of the corresponding object or grouping of objects. For instance, age may be used to describe a psychographic makeup of a consumer, such that instead of being labeled as a 35 year old on the basis of factual data, the consumer's behaviors, attitudes and actions reflect those of someone who is 10 years older. As such, the consumer's psychographic profile would be of a 45 year old.

In embodiments of the present invention, objects within a system are each associated with symmetrical object profiles containing the same attribute information. That is, within the system, all objects comprising one or more types of objects are defined by and are reflected by the same attributes, wherein objects comprise one or more types of objects (e.g., consumers, assets, products, advertisements, experiences, etc.). In that manner, any object takes on its own psychographic profile as defined by the attribute scores in its own object profile. More specifically, an inanimate object (e.g., product, asset, advertisement, experience, etc.) is defined by an object profile that is reflective of the objects (e.g., consumers) that it interacts with, such as, transactions involving two or more objects. For example, a movie as an object is defined by its object profile that is reflective of those consumers who have requested that movie, such as, in an online video content hosting site.

In another embodiment, symmetrical object profiles exist across a plurality of object types. For instance, a system including two object types (e.g., viewers and videos) also includes additional object types (e.g., third, fourth, and fifth types), wherein the objects spread across the five object types are associated with corresponding symmetrical object profiles comprising the same attributes. As an example, a first object type is a user, a second object type is an article, and a third object type is an online text based article including an embedded video associated with the article. In an interaction between objects, the user (object 1) reads the article (object 2), and watches the video (object 3) that is embedded in the article. There are two interactions: object 1>>object 2 (user reads article), and object 1>>object 3 (user views video). Symmetrical object profiles for each of the objects 1-3 would reflect these two interactions. That is, object profiles for all three objects are updated to reflect participation in these two interactions.

The implementation of symmetrical object profiles provides for closer and more accurate building of relationships between objects. In particular, direct attribute to attribute comparisons for one or more groupings of attributes within object profiles of two or more objects gives a sense of the closeness of matching between these objects. This enables better targeting of advertisements, other content, and online experiences (e.g., video links, applications, forums, etc.), as well as improved audience analytics. This in turn drives higher advertising costs per mile (CPMs), higher engagement with users, increased success of advertisement delivery, and development of new programming and customer relationship management strategies. All of this leads to increased revenue opportunities.

Figure 2:
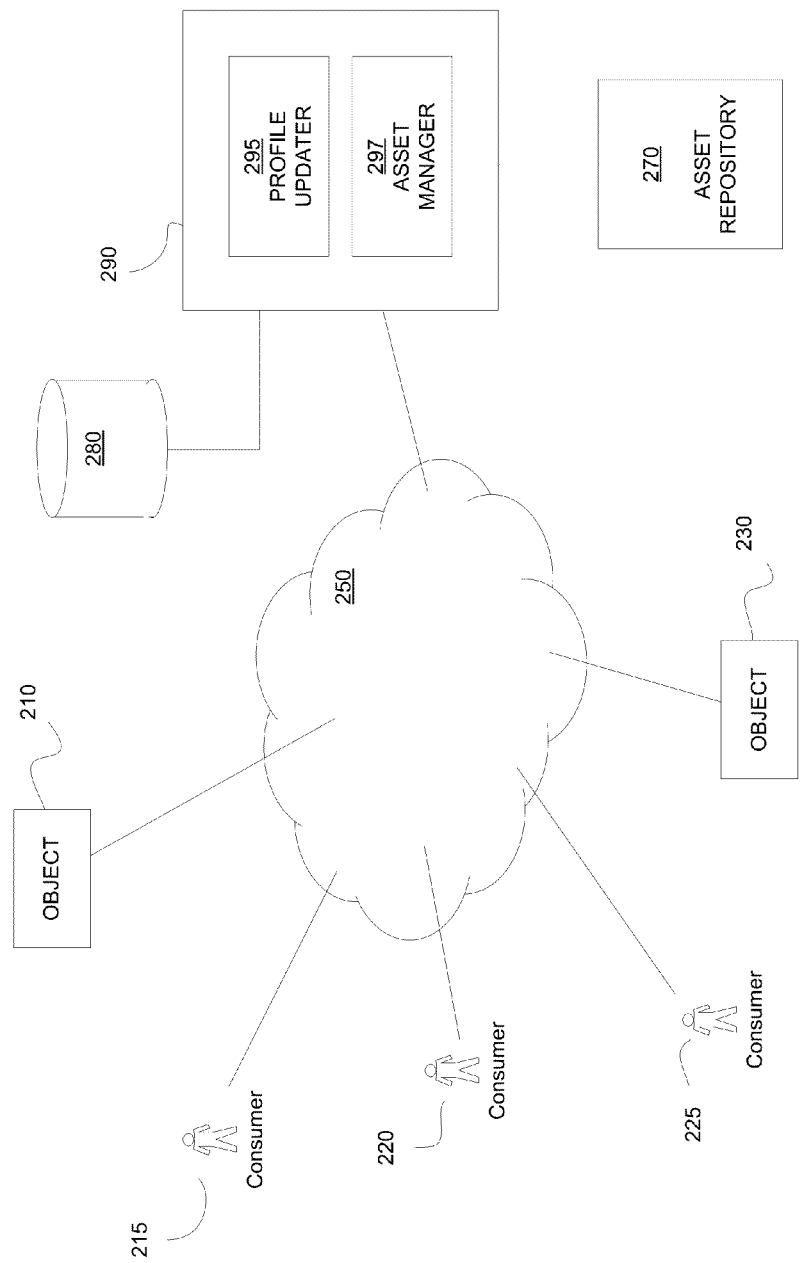
FIG. 2 is an illustration of a communication network facilitating transactions between one or more objects associated with symmetrical object profiles, in accordance with one embodiment of the present disclosure.

FIG. 2 is an illustration of a system 200 facilitating transactions between two or more objects associated with symmetrical object profiles, in accordance with one embodiment of the present disclosure. System 200 includes a communication network 250 that is capable of enabling communication between one or more objects and/or entities that are coupled to the network 250. For example, in one embodiment, the communication network 250 is the internet, but could be any suitable network capable of supporting transactions between two or more objects.

As shown, an online platform/site or host system 290 is coupled to communication network 250. Though shown as one block, host system 290 may include one or more actual servers located in one or more locations, but act to provide server functionality to support the management and distribution of a plurality of assets (e.g., television programs, video content, movies, etc.) stored in repository 270. For instance, host system 290 provides access to assets in repository 270 to one or more objects through communication network 250.

As shown in FIG. 2, generalized objects 210 and 230, as well as consumers 215, 220, 225 are coupled to communication network 250 through an associated computing resource. For illustration, consumers and/or other objects may be coupled to communication network 250 through a standalone computer, portable computer, mobile phone, smart phone, tablet, etc.).

For purposes of illustration only, communication system 200 may support a host system 290 that manages online content for purposes of distribution and archiving. Host system may comprise a part of a larger online entertainment service that provides for a source for users to search for and access entertainment content. For instance, host system 290 includes an asset manager 297 that manages and archives a plurality of assets stored in the repository 270. As an extension, host system 290 may provide access to those assets that are stored in the repository 270 to other objects within system 200. For example, host system 290 may manage video content (e.g., television/cable programming, movies, entertainment clips, news, etc.) that is made available to one or more objects. In that manner, a consumer (e.g., consumer 215) may interact with host system 290 to select a movie to download for viewing. The selection by the consumer defines a transaction involving the consumer and the movie, and in embodiments of the present invention, object profiles for both the consumer and the movie are updated to reflect that transaction. Other transactions between objects are supported within communication system 200. For instance, a transaction may be defined between object 210 and an asset managed by host system 290, wherein object 210 may include an asset, a consumer, another web site, a group of consumers, etc.

Host site 290 includes a profile updater 295 for managing a plurality of object profiles for objects associated with transactions handled by host system 290. For instance, a plurality of object profiles related to the assets stored in repository 270 are created, managed and stored by profile updater 295. As previously described, an object profile for an asset contained within asset repository 270 defines a psychographic profile that is reflective of object profiles requesting that asset through host system 290.

Additionally, profile updater 295 creates, manages, and stores a plurality of object profiles that are associated with other objects involved in transactions with objects and/or assets controlled by host system 290. That is, profiles are created by profile updater 295 for objects that interact with host system 290, such as, when requesting assets stored in repository 270. As an example, object profiles include those that are created for consumers (e.g., 215) requesting assets through host system 290. For instance, a consumer may voluntarily register with host system 290 in order to enable access to assets in repository 270, wherein the registration involves the creation of a corresponding object profile. A more detailed description for the creation and management of object profiles is provided in relation to FIG. 3.

Further, as shown in FIG. 2, storage module 280 is used to store the various object profiles as generated and managed by profile updater 295. As shown, storage module 280 is coupled locally to host system 290, in one embodiment. However, storage module 280 may be remotely located in other embodiments, and accessible through communication network 250. Still other embodiments are supported, wherein object profiles are stored at locations associated with a corresponding object, such as, a local computing resource.

Figure 3:
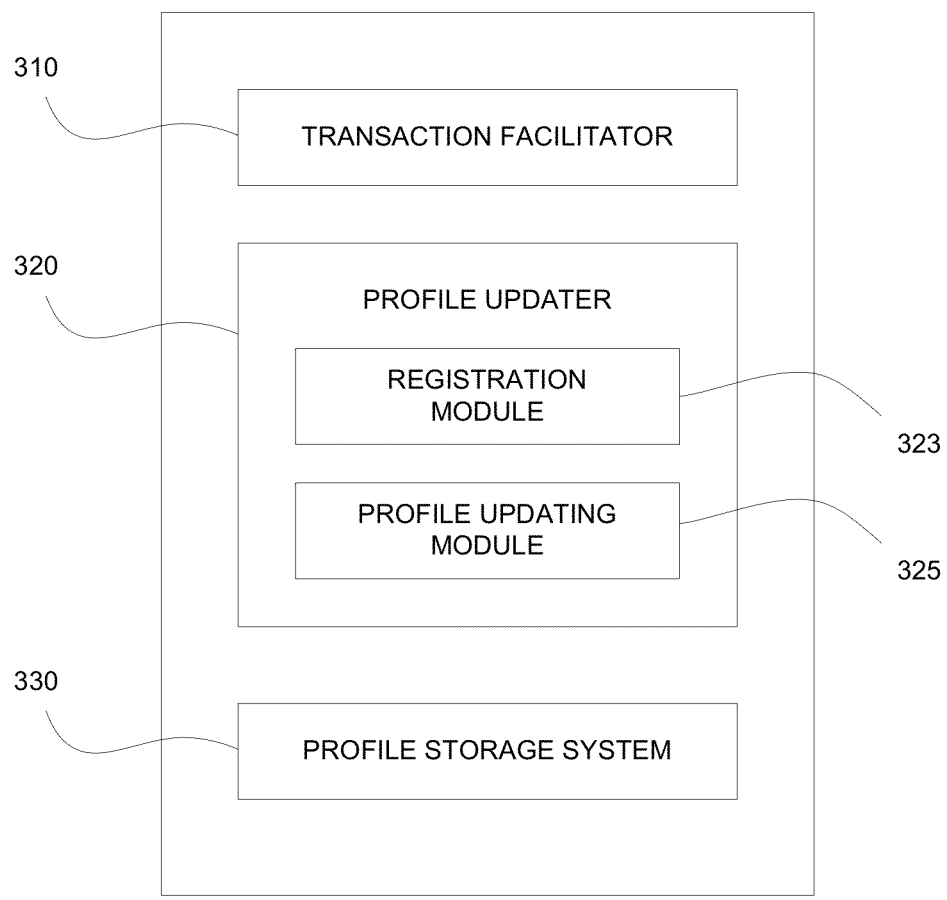
FIG. 3 is a system implementing symmetrical object profiles across one or more objects, wherein an object profile is influenced by other object profiles with which it interacts, in accordance with one embodiment of the present disclosure.

FIG. 3 is a system 300 implementing symmetrical object profiles across one or more objects, wherein an object profile is influenced by other object profiles with which it interacts, in accordance with one embodiment of the present disclosure. In that manner, transaction activity (e.g., consumption activity) is used to create continuously evolving, granular, object profiles for objects involved in a transaction (e.g., consumer purchasing a product) that can then be applied to targeting and analytical applications. In one embodiment, system 290 of FIG. 2 performs in part similar functions as system 300, such as, the creation and management of object profiles. In still another embodiment, system 300 is implemented within system 100 of FIG. 1.

As shown, system 300 includes a transaction facilitator 310. More specifically, facilitator 310 is configured to support the interaction between two or more objects, as defined by a transaction. For instance, a transaction facilitator 310 may provide an online search platform within which a consumer as one object may search for other objects, such as, goods and/or services, to include products, video content, online experiences, etc. As such, facilitator may support the interfaces that allow the consumer to interact with and to select one or more objects. For illustration, in one embodiment transaction facilitator is configured to allow a consumer to select from a plurality of video content (e.g., movies) for purchase and/or viewing download of a particular movie (e.g., Movie X), in a transaction involving two objects: the consumer and Movie X.

System 300 also includes a profile updater 320 that is capable of collecting and/or generating attribute information in an object profile associated with a corresponding object. As previously described, object profiles are symmetrical across all objects and all types of objects in a system facilitating transactions between those objects. For instance, profiles are mirrored between consumer objects and product/asset objects, such that in a transaction between a consumer and an asset, profiles for the consumer and asset reflect the interaction between those two objects as will be further described in relation to FIGS. 5-7. In that manner, closer relationships between objects can be realized based on the differences of one or more valuations of groupings of attributes in the symmetrical object profiles.

In particular, profile updater 320 creates and manages a first object profile that is associated with a first object. The first object profile comprises a set of attributes having a first set of valuations. That is, values for each of the set of attributes is contained in the first set of valuations. In one embodiment, the first object profile is of a first type, such as, that defining a consumer.

In addition, profile updater 320 creates and manages a second object profile that is associated with a second object. Because object profiles are symmetrical for all objects in a system facilitating transactions between those objects, the second object profile comprises the same set of attributes. However, the set of attributes associated with the second object has a second set of valuations. That is possibly different values for each of the set of attributes is contained in the second set of valuations. In one embodiment, the second object profile is of a second type, such as, that defining an asset (e.g., movie, product, experience, etc.).

More particularly, profile updater 320 includes a profile updating module 325 that is configured to update attribute valuations in the object profiles associated with the first object and the second object. In particular, in a transaction involving the first and second objects, the updating module 325 is configured to update object profiles for both the first and second objects based on valuations in the first and second set of valuations. That is, attribute valuations associated with the first object profile for the first object are updated to reflect the interaction with the second object. In that manner, the first object profile is influenced by the attribute valuations in the second object profile, and in a way takes on characteristics of the second object. In particular, the first object profile is updated based on the second set of valuations of attributes in the second object profile.

Likewise, attribute valuations associated with the second object profile for the second object are also updated to reflect the interaction with the first object. As such, the second object profile is influenced by the attribute valuations in the first object profile, and takes on characteristics of the first object. In particular, the second object profile is updated based on the first set of valuations of attributes in the first object profile.

The profile updating module 325 allows for continuous updates to each object profile. That is, instead of having static object profiles that do not change over time, embodiments of the present invention provide for object profiles that are updateable with each transaction. As such, in a transaction between two or more objects, corresponding object profiles are updated to reflect the characteristics of all objects involved in the transaction. In this manner, even an object profile for an object that lies dormant for a long period of time but then suddenly becomes a cult classic (e.g., cult movies), is able to reflect the behavioral characteristics of its ever changing consumers through continual updating of its object profile.

In one embodiment, profile updater 320 includes a registration module 323 for gathering initial information for a related object profile. For instance, a consumer may register with an online host system to enable access to content (e.g., news, information, television programming, movies, etc.)

provided by that host system. In this case, when registering, the consumer may provide various items of information, including user name, local address, age, gender, income, certain preferences, etc. As such, information obtained during registration is used to seed the corresponding object profile with an initial set of valuations for attributes contained in the object profile.

In other embodiments, an object profile is seeded using third party information. For instance, user profiles from social networking sites may include information, such as, user name, address, etc. Additional behavioral information exhibited by the user and other personal information may also have been gathered and dissected for inclusion within the third party profile. This third party information may be gathered and filtered in order to seed the initial state of a corresponding object profile. For example, a consumer object that is associated with a third party social networking user profile, such that the object profile generated by profile updater 320 includes and/or is based on information obtained from the third party user profile.

In still another embodiment, an initial seeding is provided through an educated guess. For instance, for an asset profile, attribute valuations may be initially provided for one or more attributes such that the profile may be used immediately for matching and targeting purposes.

System 300 also includes a profile storage system 330 for storing object profiles of objects interacting in transactions in association with system 300, such as, through facilitator 310. More particularly, storage system 330 stores the first object profile and the second object profile. In addition, in association with each object profile, a history of transactions is also stored. That is, for a particular object, a history of transactions is involving that object with other objects is stored. In that manner, the object profile for that object is easily updated given any subsequent transactions with any other object.

Profile storage system 330 may be coupled locally with the profile updater for quick access. This provides for real-time updating of object profiles as transactions are occurring. In that manner, additional targeted content (e.g., advertisements, additional products, etc.) may be presented to one or more objects involved in a transaction based on the current valuations of attributes in corresponding object profiles. In still other embodiments, storage system 330 may be remotely located when latency is of lesser concern, or if network access is still fast enough that latency is mitigated.

In one embodiment, a profile is associated with a group of objects. Specifically, the group profile, also referred to as a "compound object profile," is still represented by the same set of attributes reflected in all the symmetrical object profiles within a system that facilitates transaction between those objects. In that case, an attribute valuation reflects the characteristic of the group as a whole, and not of an individual within the group. For instance, in one embodiment, each object in the group is associated with a corresponding object profile, and the group object profile or compound object profile is based on the individual object profiles of group members. In one example, attribute valuations for the group profile are averaged across all individual member object profiles. In particular, for a first attribute in the group profile, valuations of corresponding first attribute valuations of individual member object profiles are averaged across the total number of members in the group. In another embodiment, attribute valuations are determined using other methodologies.

For illustration only, a natural grouping of objects includes all immediate members of a certain family within a particular household, such as, father, mother, and any children. Other groupings may define a group of individuals within a certain population. Still other groupings may define a group of assets, such as, B horror movies. A group profile or compound object profile can be used to define behavioral characteristics of the entire group for purposes of increased object to object matching, targeted advertisement delivery, targeted content delivery, and targeted experiences delivery.

In one embodiment, all members are treated equally. That is, any transaction involving a single family member will affect the valuations in the group profile or compound object profile equally. As such, a transaction between a child and an object is treated the same as another transaction between a father and the same or different object. In these cases, any updating of the group profile is performed without consideration as to which member of the family participated in the transaction.

On the other hand, in another embodiment, group members are not treated equally. Some group members are given higher importance in relation to their influences on the group profile. For instance, a parent might be given greater importance and be a better gauge as to how the group as a whole will behave when it comes to financial decisions for purposes of advertisement, content, experience targeting. In these cases, members with greater importance may be weighted, such that any transaction involving those important members (parents) will be more heavily weighted than a transaction involving less important members (e.g., children), especially when involving transactions with financial bearing, such that parents who have greater purchasing power and decision making will more greatly influence the group profile.

A more detailed description of the grouping of objects within a compounded object and its corresponding compound object profile is provided in relation to FIGS. 8, 9A-B, and 10A-B. In particular, two types of compounded objects are described, including declared and inferred types of objects.

Figure 4:
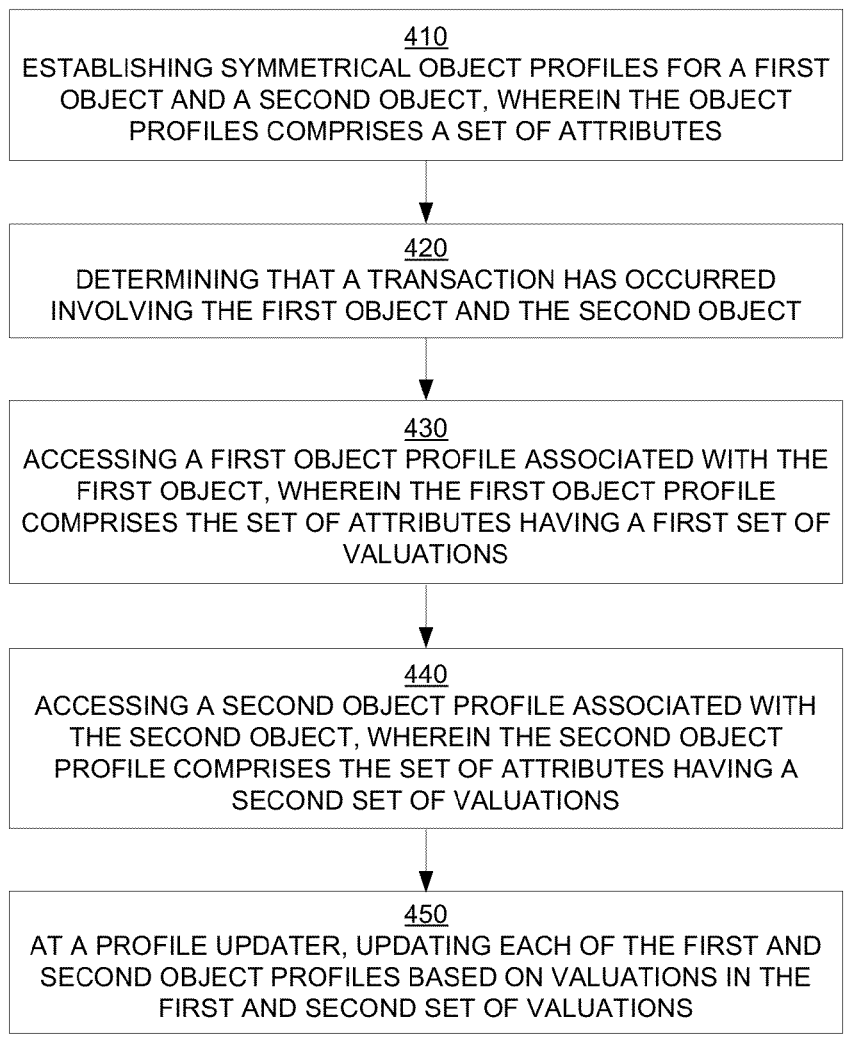
FIG. 4 is a flow diagram illustrating a method for implementing symmetrical object profiles across one or more objects, wherein an object profile is influenced by other object profiles with which it interacts, in accordance with one embodiment of the present disclosure.

FIG. 4 is a flow diagram 400 illustrating a method for implementing symmetrical object profiles across one or more objects, wherein an object profile is influenced by other object profiles with which it interacts, in accordance with one embodiment of the present disclosure. In another embodiment, flow diagram 400 is implemented within a computer system including a processor and memory coupled to the processor and having stored therein instructions that, if executed by the computer system causes the system to execute a method for implementing symmetrical object profiles across one or more objects, wherein an object profile is influenced by other object profiles with which it interacts. In still another embodiment, instructions for performing a method are stored on a non-transitory computer-readable storage medium having computer-executable instructions for causing a computer system to perform a method for implementing symmetrical object profiles across one or more objects, wherein an object profile is influenced by other object profiles with which it interacts. The method outlined in flow diagram 400 is implementable by one or more components of the computer system 100, system 200 and system 300 of FIGS. 2, and 3, respectively.

At 410, the method includes establishing symmetrical object profiles for a first object and a second object. The object profile comprises a set of attributes, and these attributes are used to describe both the first and the second object, even if these two objects are of the same type or of different types (e.g., consumer and product/asset). In that manner, the object profiles are mirrored between the two objects, such that a determination of how close a relationship between the two objects can be made based on comparing attribute valuations in both object profiles. An example of a symmetrical object profile is provided in FIG. 5 as described more fully below.

At 420, the method includes determining that a transaction has occurred involving the first object and the second object. The transaction is defined as any interaction between the first object and the second object. For instance, in the previous example of an online content provider providing access to video content (e.g., television programming, movies), a transaction can involve a consumer object purchasing a movie/asset object. Another transaction includes a general interest of a consumer with a particular asset object (e.g., television programming, movie, etc.) that is expressed through a selective click-through.

At 430, the method includes accessing a first object profile associated with the first object that is involved in the transaction. In the system with symmetrical object profiles, the first object is associated with a first object profile, wherein the first object profile comprises the set of attributes having a first set of valuations. For instance, in a system facilitating transactions between consumer objects and movie/asset objects, the first object comprises a consumer that is associated with a consumer profile as defined by the first set of valuations for the set of attributes.

At 440, the method includes accessing a second object profile associated with the second object that is involved in the transaction. In the system with symmetrical object profiles, the second object is associated with a second object profile, wherein the second object profile comprises the same set of attributes, but now having a second set of valuations. In the example of transactions involving consumer objects and movie/asset objects, the second object comprises a movie asset that is associated with an asset profile as defined by the second set of valuations for the same set of attributes.

At 450, the method includes updating each of the first and second object profiles based on each other's attribute valuations. In one embodiment, updating is performed by a profile updater that creates and manages the first and second object profiles. More particularly, each of the first and second object profiles are updated based on attribute valuations in both object profiles. In that manner, attribute valuations in each of the first and second object profiles are updated to reflect the interaction with the other object. For example, the first object profile is updated based on the second set of valuations of attributes in the second object profile, and as such is influenced by the second object profile. Also, the second object profile is updated based on the first set of valuations of attributes in the first object profile, and as such is influenced by the first object profile. As such, transaction activity is used to create up-to-date and granular object profiles for the first and second objects that can then be applied for purposes of advertisement, content, and experiences targeting, and furthermore for analytical applications.

FIG. 5 is a Table 500 illustrating a symmetrical object profile, in accordance with one embodiment of the present disclosure. The symmetrical object profile in Table 500 is used in a system that is configured to facilitate interactions and transactions between objects. For example, the system may be configured to facilitate transactions between consumer objects and movie/asset objects for viewing or purchase. The implementation of symmetrical object profiles for objects that potentially can be involved in a transaction provide for a meaningful and quantifiable description of how close a relationship exists between two objects based on comparing attribute valuations in both object profiles.

The symmetrical object profile in Table 500 comprises one or more attributes as defined by attribute column 520, each defining a particular characteristic (e.g., behavioral, demographic, etc.). In one embodiment, attributes are further grouped into one or more categories as defined by the category column 510. As such, attributes within a given category are closely related. Valuations for each category for a particular object profile is provided in the scoring column 530. For purposes of illustration only, categories in the symmetrical object profile 500 include those describing or defining gender, age, and movie genre. Other groupings of the same or different categories and/or attributes may define other symmetrical object profiles 500.

Importantly, attribute valuations can take on a sliding scale within a category. That is, valuations may be greater than 0 for one or more attributes within a given category, as long as attribute valuations within a given category total 100 percent, or a representative 1.000. For example, scores for attributes may be distributed throughout attributes in the age category 515. In that manner, the psychographic profile describing the age of a consumer behaviorally describes a consumer that fits at least partly within one or more age attributes. Further, the total sum of valuations for attributes equals 100 percent for the age category 515. In that manner, an object profile for a given category is no longer shaded, and is shaded between the various attributes.

In particular, in Table 500 the symmetrical object profile includes a gender category 513 that includes two attributes, a male attribute 523A and a female attribute 523B. For example, when used to describe a consumer object, the psychographic profile of the consumer as influenced by the consumer's transactions with other assets, may reflect on the one hand a combination of male and female characteristics, or on the other hand be predominantly male or female. For instance, though a consumer is factually male, the consumer may be psychographically labeled are more female when the consumer repeatedly requests movies exhibiting behavioral characteristic because it is favored by other consumers exhibiting female characteristics/attributes. Also, when used to describe an asset object (e.g., movie), the same attributes are used to give a behavioral characteristic to the asset as reflected and influenced by the users requesting the asset. In that manner, the asset may reflect any combination of male and female characteristics.

Also, the symmetrical object profile of Table 500 includes an age category 515 comprising 7 different attributes 525A-G: a 19-25 attribute 525A, a 26-34 attribute 525B, a 26-34 attribute 525C, a 35-44 attribute 525D, a 45-54 attribute 525E, a 55-65 attribute 525F, and an over 65 attribute 525G. When used to describe a consumer object, the psychographic profile of the consumer may exhibit any combination of age attribute characteristics. For instance, though a consumer may be factually be within the 26-34 attribute 525C, the consumer may be psychographically labeled as more older, as influenced by selection of assets generally favored by older attributed consumers. Similarly, when used to describe an asset object (e.g., movie), one or more combinations of attribute valuations for age attributes is possible, as influenced by those consumers and their age attributes selecting that asset. For instance, a movie may be popular with the 19-25 age attribute 525B, as well as the over 65 attribute 525G.

Further, symmetrical object profile of Table 500 includes a movie genre category 517 that includes 3 attributes, such as, an action attribute 527A, a romance attribute 527B, and a thriller attribute 527C. When used to describe a consumer object, the psychographic profile of the consumer may exhibit any combination of movie genre attributes that define how much that consumer prefers movies of a particular genre, as influenced by characteristics of selected movie assets. Similarly, when used to describe an asset object (e.g., movie), the psychographic profile of the asset may also exhibit any combination of attribute scores or values, as influenced by those consumers who selected that movie asset and their behavioral characteristics.

FIG. 6 is an illustration of the seeding of attribute valuations in two objects within a system configured for implementing symmetrical object profiles across one or more objects, wherein an object profile is influenced by other object profiles with which it interacts, in accordance with one embodiment of the present disclosure. In particular, the object profiles shown in FIG. 6 are consistent with the symmetrical object profile shown in Table 500 of FIG. 5, and comprise a set of attributes, and more specifically, a set of categories (e.g., gender, age and movie genre) for that set of attributes.

Object profiles are implemented in a system that is configured to facilitate interactions and transactions between objects. For example, the system may be configured to facilitate transactions between consumer objects and movie/asset objects for viewing or purchase. For purposes of illustration, the first object 610 comprises a consumer, and the second object 650 comprises a movie asset.

As previously described, the seeding may of initial attribute valuations may be accomplished through various methods, including registration, incorporation and/or interpretation of third party attribute values, or manual settings inputted by a human or automated profiler.

As shown, Table 605 illustrates the seeding of an object profile for a first object 610. Initially, only two attributes in two categories are given valuations. Valuations for attributes in the movie genre category are given a 0.000. More particularly, attribute 630 of the age category is given a value of 100 percent (e.g., 1.000), and defines the consumer, first object 610 as falling within the age of 35-44. Also, attribute 620 of the gender category is given a value of 100 percent (e.g., 1.000), and indicates that the consumer at least initially exhibits full male characteristics. Values for Table 605 may have been provided initially by the consumer through registration.

As shown, Table 655 illustrates the seeding of an object profile for a second object 650. Initially, three attributes across two categories are given valuations. Valuations for attributes in the age category are given a value of 0. More particularly, attribute 660 of the gender category is given a value of 100 percent (e.g., 1.000), and indicates that the movie asset, at least initially, is predicted to be favored by females. Also, attribute 670 and attribute 675 of the movie genre category are each given values of 50 percent (e.g., 0.500). This indicates that the movie asset may exhibit characteristics or fit within both action and thriller genres. Values for Table 655 may have been provided initially by an editor.

The seeding of an object profile begins a history of transactions for the corresponding object. In particular, the seeding defines the first transaction in the history of transactions for the object. Values provided throughout the history of transactions are used to determine the latest attribute valuations, and as such are stored for real-time calculations of attribute valuations as influenced by a transaction conducted with the corresponding object, as will be further described in relation to FIGS. 7A-C.

FIGS. 7A-C illustrate various states of an object profile of a consumer and corresponding object profiles of objects with which the consumer has conducted a transaction after each of three different transactions, in accordance with embodiments of the present disclosure. In particular, the object profiles shown in FIGS. 7A-C are consistent with the symmetrical object profile shown in Table 500 of FIG. 5, and comprise a set of attributes, and more specifically a set of categories (e.g., gender, age, and movie genre) for that set of attributes. For purposes of illustrations, only the gender category as defined by two attributes (e.g., male and female) is shown in each of the object profiles shown in FIGS. 7A-C to illustrate the determination of attribute valuations after each of the transactions.

As previously described, the object profiles are implemented in a system that is configured to facilitate interactions and transactions between objects. For example, the system may be configured to facilitate transactions between consumer objects and movie/asset objects for viewing or purchase. For purposes of illustration, Consumer-A comprises a consumer that is involved in transaction with ASSET-X, ASSET-Y, and ASSET-Z, each of which comprises a movie asset.

In particular, FIG. 7A is an illustration of a first state of an object profile of Consumer-A after an interaction with ASSET-X within a history of interactions involving Consumer-A, in accordance with one embodiment of the present disclosure. For instance, Table 710A illustrates valuations for attributes in the gender category in the object profile of Consumer-A both before and after the transaction involving Consumer-A and ASSET-X. Also, Table 720 illustrates valuations for attributes in the gender category in the object profile of ASSET-X both before and after the transaction involving Consumer-A and ASSET-X.

As shown in Table 710A, attribute valuations are reflective of two transactions in a history of transactions involving Consumer-A to include the current transaction with ASSET-X. Previously, the first transaction in the history of transactions was the initial seeding of attribute valuations, as described in Table 605 of FIG. 6. As such, under the old score, the psychographic profile of Consumer-A indicates a fully male characteristic as indicated by the 100 percent value (0.000) in the male attribute, and the 0 percent value (e.g., 0.000) for the female attribute.

Also, as shown in Table 720, attribute valuations are reflective of two transactions in a history of transactions involving ASSET-X, to include the current transaction with Consumer-A. Previously, the first transaction in the history of transactions for ASSET-X may have been with Consumer-A or another consumer, or may have been seeded with attribute valuations by an editor. As such, under old score, the psychographic profile of ASSET-X indicates a fully female characteristic, as indicated by the 100 percent value (e.g., 1.000) in the female attribute, and the 0 percent value (0.000) for the male attribute in Table 720.

Looking at the object profile for Consumer-A in Table 710A, the new scores for the male and female attributes are influenced by the attribute valuations in the object profile for ASSET-X after the transaction between Consumer-A and ASSET-X. In that manner, the attribute valuations for Consumer-A are updated to reflect the interaction with the ASSET-X, and in a way takes on the behavioral characteristics of the ASSET-X.

In particular, attribute valuations for any attribute is updated by averaging corresponding attribute values for objects in a history of transactions involving Consumer-A, wherein the average is based on the total number of transactions. In the present example as shown in Table 710A, for the male attribute 715A, the history of transactions includes an attribute valuation from the initial seeding (1.000) as indicated from the old score in Table 710A, and the contributions of the attribute valuation (0.000) from the object profile of ASSET-X as indicated by the current transaction with ASSET-X and Consumer-A. As such, the average of the attribute values for the male attribute in the history of transactions involving Consumer-A and its corresponding objects is ½(1.000+0.000)=0.500 or 50 percent, as indicated under the new score for the male attribute 715A for Consumer-A. Similarly, the average of the attribute values for the female attribute in the history of transactions involving Consumer-A and its corresponding objects is ½(0.000+1.000)=0.500 or 50 percent, as indicated under the new score for the female attribute 717A for Consumer-A.

As shown in Table 710A, after the transaction with ASSET-X, Consumer-A behaviorally is a mixture of 50 percent male and 50 percent female. This is in contrast to the 100 percent male characteristic for Consumer-A exhibited before the transaction with ASSET-X. This is due in part to the low sample size, and the highly opposite scoring for gender attributes between Consumer-A and ASSET-X. However, within a few transactions, a more accurate reflection of the behavioral characteristics for Consumer-A will be shown in the object profile, as is shown in FIGS. 7B-C.

For the object profile for ASSET-X shown in Table 720, for the male attribute 725, the history of transactions includes an attribute valuation from the initial seeding (0.000) as indicated from the old score in Table 720, and the contributions of the attribute valuation (1.000) from the object profile of Consumer-A, as indicated by the current transaction with ASSET-X and Consumer-A. As such, the average of the attribute values for the male attribute in the history of transactions involving ASSET-X and its corresponding objects is ½(0.000+1.000)=0.500 or 50 percent, as indicated under the new score for the male attribute 725 for ASSET-X. Similarly, the average of the attribute values for the female attribute in the history of transactions involving ASSET-X and its corresponding objects is ½(1.000+0.000)=0.500 or 50 percent, as indicated under the new score for the female attribute 727 for ASSET-X.

In particular, FIG. 7B is an illustration of a second state of an object profile of Consumer-A after an interaction with ASSET-Y within a history of interactions involving Consumer-A, in accordance with one embodiment of the present disclosure. For instance, Table 710B illustrates valuations for attributes in the gender category in the object profile of Consumer-A both before and after the transaction involving Consumer-A and ASSET-Y. Also, Table 730 illustrates valuations for attributes in the gender category in the object profile of ASSET-Y both before and after the transaction involving Consumer-A and ASSET-Y.

As shown in Table 710B, attribute valuations under the new score are reflective of three transactions in a history of transactions involving Consumer-A to include the current transaction with ASSET-Y, the transaction with ASSET-X, and the initial seeding of attribute valuations, as described in Table 605 of FIG. 6. Under the old score in Table 710B, the psychographic profile of Consumer-A indicates a 50 percent (0.500) male and female valuation representative of the first state of the object profile for Consumer-A.

Also, as shown in Table 730, attribute valuations are reflective of thirty-one transactions in a history of transactions involving ASSET-Y, to include the current transaction with Consumer-A. Under the old score, the psychographic profile of ASSET-Y indicates a sixty-three percent (0.633) male characteristic and a thirty-seven (0.367) female characteristic in Table 730.

Looking at the object profile for Consumer-A in Table 710B, the new scores for the male and female attributes are influenced by the attribute valuations in the object profile for ASSET-Y after the transaction between Consumer-A and ASSET-Y. In that manner, the attribute valuations for Consumer-A are updated to reflect the interaction with the ASSET-Y, and in a way takes on the behavioral characteristics of the ASSET-Y. As previously described, attribute valuations for any attribute is updated by averaging corresponding attribute values for objects in a history of transactions.

In the present example as shown in Table 710B, for the male attribute 715B, the history of transactions includes an attribute valuation from the initial seeding (1.000), and the contributions of the attribute valuation (0.000) from the object profile of ASSET-X, and the contributions of the attribute valuation (0.633) from the object profile of ASSET-Y. As such, the average of the attribute values for the male attribute in the history of transactions involving three transactions between Consumer-A and its corresponding objects is ⅓(1.000+0.000+0.633)=0.544 or 54 percent, as indicated under the new score for the male attribute 715B for Consumer-A. Similarly, the average of the attribute values for the female attribute in the history of transactions involving Consumer-A and its corresponding objects is ⅓(0.000+1.000+0.367)=0.456 or 46 percent, as indicated under the new score for the female attribute 717B for Consumer-A.

For the object profile for ASSET-Y shown in Table 730, for the male attribute 735, the history of transactions includes valuations from 30 transactions (not shown) and the contributions of the attribute valuation (0.500) from the object profile of Consumer-A, as indicated by the current transaction between ASSET-Y and Consumer-A. As such, the average of the attribute values for the male attribute in the history of transactions involving ASSET-Y and its corresponding objects is approximately 63 percent, as indicated under the new score for the male attribute 735 for ASSET-Y. Similarly, the average of the attribute values for the female attribute in the history of transactions involving ASSET-Y and its corresponding objects is approximately 37 percent, as indicated under the new score for the female attribute 737 for ASSET-Y.

Moreover, FIG. 7C is an illustration of a third state of an object profile of Consumer-A after an interaction with ASSET-Z within a history of interactions involving Consumer-A, in accordance with one embodiment of the present disclosure. For instance, Table 710C illustrates valuations for attributes in the gender category in the object profile of Consumer-A both before and after the transaction involving Consumer-A and ASSET-Z. Also, Table 740 illustrates valuations for attributes in the gender category in the object profile of ASSET-Z both before and after the transaction involving Consumer-A and ASSET-Z.

As shown in Table 710C, attribute valuations under the new score are reflective of four transactions in a history of transactions involving Consumer-A to include the current transaction with ASSET-Z, the transaction with ASSET-Y, the transaction with ASSET-X, and the initial seeding of attribute valuations. Under the old score in Table 710C, the psychographic profile of Consumer-A indicates a 54 percent (0.544) male valuation and 46 percent (0.456) representative of the second state of the object profile for Consumer-A.

Also, as shown in Table 740, attribute valuations are reflective of twelve transactions in a history of transactions involving ASSET-Z, to include the current transaction with Consumer-A. Under the old score, the psychographic profile of ASSET-Z indicates a 75 percent (0.750) male characteristic and a twenty-five (0.250) female characteristic in Table 740.

Looking at the object profile for Consumer-A in Table 710C, the new scores for the male and female attributes are influenced by the attribute valuations in the object profile for ASSET-Z after the transaction between Consumer-A and ASSET-Z. In that manner, the attribute valuations for Consumer-A are updated to reflect the interaction with the ASSET-Z, and in a way takes on the behavioral characteristics of the ASSET-Z. As previously described, attribute valuations for any attribute is updated by averaging corresponding attribute values for objects in a history of transactions.

In the present example as shown in Table 710C, for the male attribute 715C, the history of transactions includes an attribute valuation from the initial seeding (1.000), and the contribution of the attribute valuation (0.000) from the object profile of ASSET-X, the contribution of the attribute valuation (0.633) from the object profile of ASSET-Y, and the contribution of the attribute valuation (0.750) from the object profile of ASSET-Z. As such, the average of the attribute values for the male attribute in the history of transactions involving four transactions between Consumer-A and its corresponding objects is ¼(1.000+0.000+0.633+0.750)=0.596 or 60 percent, as indicated under the new score for the male attribute 715C for Consumer-A. Similarly, the average of the attribute values for the female attribute in the history of transactions involving Consumer-A and its corresponding objects is ¼(0.000+1.000+0.367+0.250)=0.404 or 40 percent, as indicated under the new score for the female attribute 717C for Consumer-A.

For the object profile for ASSET-Z shown in Table 740, for the male attribute 735, the history of transactions includes valuations from 12 transactions (not shown) and the contributions of the attribute valuation (0.544) from the object profile of Consumer-A, as indicated by the current transaction between ASSET-Z and Consumer-A. As such, the average of the attribute values for the male attribute in the history of transactions involving ASSET-Z and its corresponding objects is approximately 73 percent, as indicated under the new score for the male attribute 745 for ASSET-Z. Similarly, the average of the attribute values for the female attribute in the history of transactions involving ASSET-Z and its corresponding objects is approximately 27 percent, as indicated under the new score for the female attribute 747 for ASSET-Z.

Compound Objects in a System Including Symmetrical Object Profiling

As previously described, in some embodiments, a group of objects is associated with a plurality of symmetrical object profiles, each represented by the same set of attributes but with varying valuations. The group of objects is implemented within a system that facilitates transactions between a plurality of objects of various types, including a transaction between a first object and the group of objects. In other examples, a group of objects may also serve as the first object being compared with another group of objects or another object.

The group of objects is herein also referred to as a compound object. Conceptually, the compound object represents a particular grouping of individual objects of the same type (hereafter referred to as "member objects"). For example, a family can be considered a compound object that represents the collective profiles of all the family members. Because individual object profiles are specific to the interactions that object has had with other objects in a system implementing symmetrical object profiles, various approaches are applied when computing a compound object profile, depending on its type.

Two types of compound objects are described, including a declared compound object and an inferred compound object. A description of declared compound objects is provided in relation to FIGS. 8 and 9A-B. A description of inferred compound objects is provided in relation to FIGS. 10A-B.

In particular, declared compound objects are defined by a known or specified relationship between its member objects. For example, if four individuals indicate that they comprise a family, that is a known, existing relationship. The relationship between member objects is declared. In another example, if a system administrator designates all objects created on a specific day to be part of a larger object, then that is a specified relationship. Both of these relationships define declared compound objects, and are described as starting with a declared relationship.

On the other hand, an inferred compound object is derived from a desired profile attribute make-up. For example, this method identifies one or more possible member object combination permutations that most closely match the desired compound profile. As a result, an inferred compound profile starts with a desired attribute make-up, and ends up with a defined list of member objects.

Figure 8:
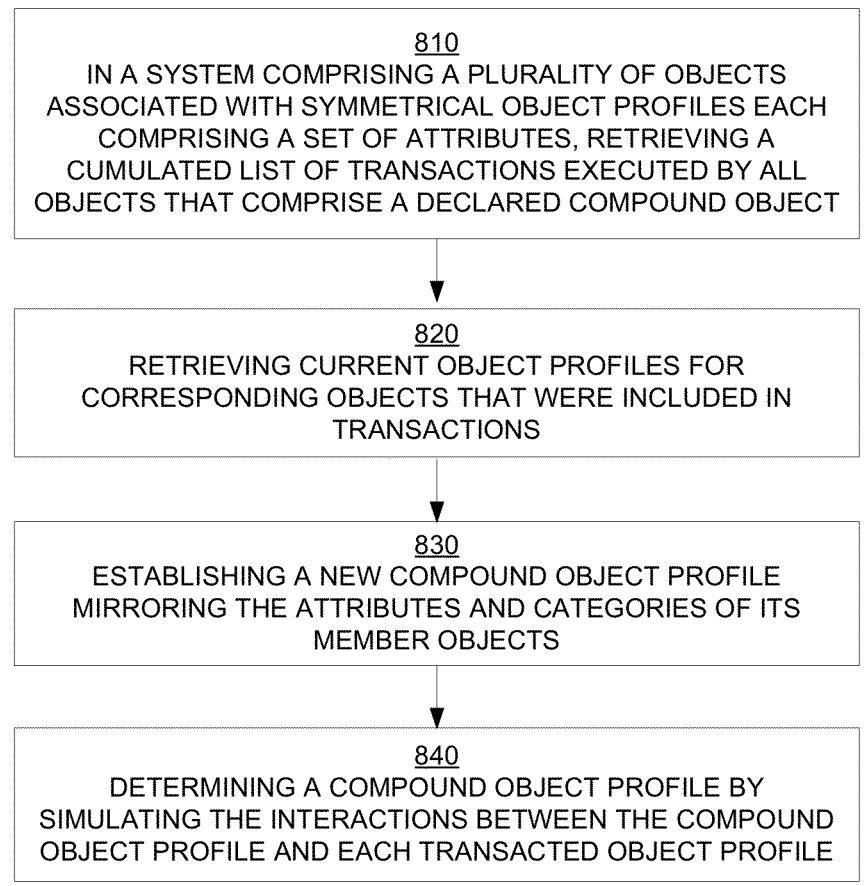
FIG. 8 is a flow diagram illustrating a method for establishing a declared compound object profile, in accordance with one embodiment of the present disclosure.

FIG. 8 is a flow diagram 800 illustrating a method for establishing a declared compound object profile, in accordance with one embodiment of the present disclosure. In one embodiment, flow diagram 800 is implemented within a computer system including a processor and memory coupled to the processor and having stored therein instructions that, if executed by the computer system causes the system to execute a method for establishing a declared compound object profile in a system with symmetrical object profiles. In still another embodiment, instructions for performing a method are stored on a non-transitory computer-readable storage medium having computer-executable instructions for causing a computer system to perform a method for establishing a declared compound object profile in a system with symmetrical object profiles. The method outlined in flow diagram 400 is implementable by one or more components of the computer system 100, and profile managers/updaters of system 200, 300, and 1200 of FIGS. 2, 3, and 12 respectively.

In particular, the method includes defining the objects within a declared compound object. For example, a family may define members and/or objects of a declared compound object, and include a mother, father, and one child. Each of the members of the declared compound object is associated with a corresponding object profile.

More specifically, the method includes at 810 retrieving and/or accessing from storage a cumulated list of transactions executed by all the objects/members that comprise the declared compound object. That is, transactions executed by each member of the compound object is accessed and retrieved. Using the family example, all transactions involving each of the members of the family are retrieved.

At 820, the method also includes retrieving and/or accessing from storage current profiles for all the corresponding objects that were involved in transactions with members of the declared compound object. For example, in the family example, family members conducted transactions with objects that are defined as film assets with corresponding film object profiles. A film asset includes a television show, or movie, or any type of video programming, wherein the film asset is associated with a corresponding and symmetrical object profile. As such, in the transactions involving the family, members viewed or watched one or more film assets (e.g., movies, etc.).

At 830, the method also includes establishing a new compound object profile that mirrors the attributes and categories of its member objects. Values for those attributes are not determined at this point. In a system for matching that includes a plurality of objects associated with a plurality of symmetrical object profiles, each defined by the same set of attributes but with differing values, the new declared compound object profile would comprise the same set of attributes associated with all objects in the system.

Figure 9A:
FIG. 9A is a table illustrating an initial state of attributes for a declared compound object profile, in accordance with one embodiment of the present disclosure.

For example, FIG. 9A is a Table 900A illustrating an initial state of attributes for a declared compound object profile, in accordance with one embodiment of the present disclosure. As shown, the declared compound object profile includes one or more attributes as defined by attribute column 910, each defining a particular characteristic. Attributes are further grouped into one or more categories, as defined by category column 905. For instance, for purposes of illustration only, categories in the declared compound object profile include those describing or defining gender, age, and movie genre. Other groupings of the same or different categories and/or attributes may define other declared compound object profiles.

Valuations for each attribute in their various categories for the declared compound object profile is provided in scoring column 915. In its initial state, attribute values for the declared compound object profile each have a zero value.

Returning back to FIG. 8, at 840, the method includes determining the valuations for attribute values for the declared compound object profile by simulating the interactions between the compound object profile, beginning in its initial state, and each transacted object profile. That is, a simulation of transactions between the declared compound object and the one or more objects with which members interacted with is performed. After each transaction, the declared compound object profile is updated. A description of updating object profiles is provided in relation to FIGS. 1-6 and 7A-C.

For instance, FIG. 9B is a Table 900B illustrating state of a declared compound object profile of FIG. 9A after a single transaction between a member of the compound object and another object in a system of multiple objects associated with symmetrical object profiles having different valuations, in accordance with one embodiment of the present disclosure. As shown, Table 900B includes column 920 which lists the number of transactions (e.g., now numbering "one") considered when determining attribute valuations for a declared compound object.

Table 900B includes column 925 which illustrates a declared compound object profile of FIG. 9A, but now after a single transaction. In the symmetrical object profile for the declared compound object profile provided in column 925, one or more attributes are provided, each defining a particular characteristic. Attributes are further grouped into one or more categories, such as, those defining gender, age, and movie genre.

Table 900B includes column 930, which illustrates an object profile of an object that was involved in a transaction with a member of the compound object (e.g., a member of a family). The object profile includes the same set of attributes and categories of attributes as that provided for the declared compound object profile in column 925, and that provided in FIG. 9A, as they are included in a system with symmetrical object profiles.

As shown in FIG. 9B, after a single transaction, the declared compound object profile provided in column 925 assumes the attribute scores of the object that was involved in a transaction with a member of the compound object. That is, the scores provided in the declared compound object profile provided in column 925 are equivalent to the scores provided in the object profile illustrated in column 930. More specifically, because it is the first transaction, by definition of simultaneous profile updating, the attribute score is equal to the total score divided by the number of transactions. In the present embodiment, the number of transactions is one. As such, the scores are mirrored between the declared compound object profile in column 925 and the object profile of column 930.

The process is included for each transaction with objects conducted by members of the compound object associated with the declared compound object profile. For instance, FIG. 9C illustrates attribute valuations for the declared compound object profile after two transactions. Specifically, FIG. 9C is a Table 900C illustrating the state of the declared compound object profile of FIG. 9A after a two transactions have occurred between one or more members of the compound object and one or more objects, in a system of multiple objects associated with symmetrical object profiles having different valuations, in accordance with one embodiment of the present disclosure. As shown, Table 900B includes column 920 which lists the number of transactions considered (e.g., now numbering "two") when determining attribute valuations for a declared compound object.

Table 900C includes column 940 which illustrates a declared compound object profile of FIGS. 9A-B, but now after two transactions. In the symmetrical object profile for the declared compound object profile provided in column 940, one or more attributes are provided, each defining a particular characteristic. Attributes are further grouped into one or more categories, such as, those defining gender, age, and movie genre.

Table 900C includes column 945, which illustrates an object profile of an object that was involved a transaction with a member of the compound object (e.g., a member of a family). The transaction is the second transaction associated with or transacted by members of the compound object. The object profile includes the same set of attributes and categories of attributes as that provided for the declared compound object profile in column 940, and that previously provided in FIGS. 9A-B, as they are included in a system with symmetrical object profiles.

As shown in FIG. 9C, after two transactions, the declared compound object profile provided in column 940 adjusts the scores or valuations for the attributes in the declared compound object profile. More specifically, the scores are updated according to the method outlined in FIG. 4, and illustrated in FIGS. 6, and 7A-C. For example, in Table 900C, the declared compound object profile includes a gender category 943 that includes two attributes: male attribute and female attribute. The corresponding psychographic profile of the compound object may reflect on the one hand a combination of male and female characteristics, or on the other hand be more skewed towards a male or female characteristic.

In determining the valuation of the male attribute, valuations for the male attribute for object profiles associated with objects involved in transactions with members of the compound object are considered and is further based on the number of transaction conducted. In one embodiment, the new valuations is determined by summing the valuations for the male attributes for all objects involved in the previously described transactions and divided by the number of transactions. In the example provided in FIGS. 9A-C, there are two transactions, and the new valuation for the male attribute is determined, as follows: (0.500+0.100)/2=0.300. Similarly, the new valuation for the female attribute is determined, as follows: (0.500+0.900)/2=0.700.

The process outlined at 840 and FIGS. 9A-C is repeated until the declared compound object profile reflects the effect of having consumed or transacted with each of the objects involved in transactions with members of the compound object.

Figure 10:
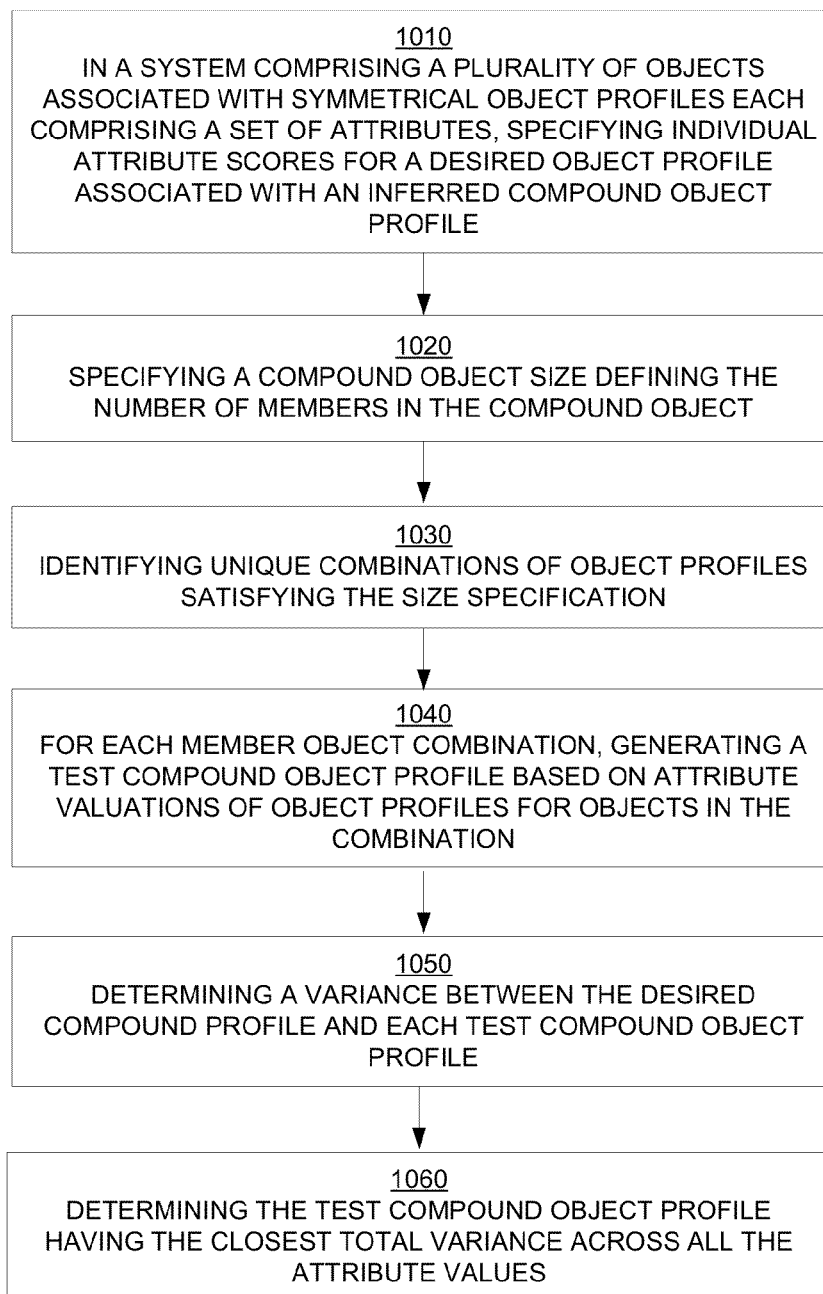
FIG. 10 is a flow diagram illustrating a method for establishing an inferred compound object profile, in accordance with one embodiment of the present disclosure.

FIG. 10 is a flow diagram 1000 illustrating a method for establishing an inferred compound object profile, in accordance with one embodiment of the present disclosure. In one embodiment, flow diagram 1000 is implemented within a computer system including a processor and memory coupled to the processor and having stored therein instructions that, if executed by the computer system causes the system to execute a method for establishing an inferred compound object profile in a system with symmetrical object profiles. In still another embodiment, instructions for performing a method are stored on a non-transitory computer-readable storage medium having computer-executable instructions for causing a computer system to perform a method for establishing an inferred compound object profile in a system with symmetrical object profiles. The method outlined in flow diagram 1000 is implementable by one or more components of the computer system 100, and profile managers/updaters of system 200, 300, and 1200 of FIGS. 2, 3, and 12 respectively.

At 1010, the method includes establishing a desired compound object profile that is associated with the inferred compound object profile. The desired compound profile is established by specifying individual attribute scores. More particularly, attribute valuations total a value of 1 (or 100 percent) per category.

For example, FIG. 11A is a Table 1100A illustrating attribute valuations for a desired compound object profile, in accordance with one embodiment of the present disclosure. As shown, the desired compound object profile includes one or more attributes as defined by attribute column 1110, each defining a particular characteristic. Attributes are further grouped into one or more categories, as defined by category column 1105. For instance, for purposes of illustration only, categories in the declared compound object profile include those describing or defining gender, age, and movie genre. Other groupings of the same or different categories and/or attributes may define other declared compound object profiles.

Valuations for each attribute in their various categories for the desired compound object profile is provided in scoring column 1115. For instance, for the gender category 1120, the male attribute valuation in block 1123 is assigned a desired value of 100 percent. As such, in order for attribute valuations in a certain category to total 100 percent, the female attribute valuation in block 1125 has a zero value. Also, for the age category 1130, the age attribute specified by ages 19-25 is assigned a valuation in block 1133 of 50 percent. Also, for the age category 1130, the age attribute specified by ages 26-34 is also assigned a valuation in block 1135 of 50 percent. The other valuations for age attributes are assigned a zero value since total valuations in a certain category total 100 percent. Further, attributes in the movie genre category 1140 are equally weighted, such that the action movie attribute, the romance movie attribute, and the thriller movie attribute are each given a valuation of 33.3 percent, which totals 100 percent for category 1140.

Returning to FIG. 10, at 1020, the method includes specifying a compound object size. The size represents and defines the number of members in the inferred compound object. In other words, the size represents the number of member profiles that will ultimately comprise the inferred compound object profile. For instance, if the size is three, then the inferred compound object contains three member objects.

At 1030, the method includes identifying one or more unique combinations of object profiles that satisfy the size specification. That is, every unique combination of object profiles is identified based on the compound object size specified in at 1020. The combinations are determined from the number of available objects in the system of objects having symmetrical object profiles, but with varying attribute valuations.

For example, if the specified compound object size is three, and there are ten objects in the system, the number of possible compound objects is determined in Equation 1, as follows:

$$C(n,k)=n!/((n-k)!k!) \tag{1}$$

FIG. 11B is a Table 1100B illustrating a list of all possible member object combinations for a given size of a compound, inferred object, in accordance with one embodiment of the present disclosure. For example, in a system of ten objects, and where the specified object size is three members, then the total number of possible compound objects as determined in Equation 1 is calculated to be 120 in Equation 2, as follows:

$$C(10,3)=10!/(7!*3!)=120 \tag{2}$$

As shown in FIG. 11B, the first combination in row 1150 includes objects 1-3. Subsequent combinations also include three objects selected from objects 1-10. For example, the 120th combination in row 1155 includes objects 8-10.

Returning back to FIG. 10, at 1040, for each member object combination, the method includes generating a test compound object profile based on attribute valuations of object profiles for objects in the combination. Specifically, in one embodiment, a test compound object profile is generated using the declared compound object generation method outlined in FIG. 8 and illustrated in FIGS. 9A-C.

As a result, a collection of test compound object profiles are generated, each corresponding to one of the possible combinations defined at 1030. For instance, in the example provided above with a system of ten objects, three are 120 possible test compound objects having corresponding test compound object profiles.

At 1050, attributes are compared between the desired object profile and each of the test compound object profiles. In particular, for a corresponding test compound object profile, for each attribute in both profiles, a variance is calculated between the attribute value in the desired compound profile and the attribute value, for the same attribute, in the corresponding test compound object profile. In one embodiment, the variance comprises an absolute value. For instance, the variance for a particular attribute is determined by subtracting each individual attribute score (using attribute values from both profiles), taking the absolute value of the difference. A total variance between the desired object profile and a corresponding test compound object profile is determined by summing variances for all attribute values between the two object profiles.

At 1060, the method includes determining the test compound object profile having the closest total variance across all the attribute values. That is, the test compound object with the smallest variance is designated as the inferred compound object. In one embodiment, it is possible to have more than one inferred compound object.

In embodiments of the present invention, for both declared and inferred compound object profiles the compound object profile exists independently of each member object profile. That is, the compound object profile is independently calculated and determined. More specifically, attribute valuations in the compound object profile are not determined from an average of the member object profiles, but is instead calculated based on the transactions of the member objects, and the object profiles for the objects that were involved in transactions with the members of the compound object.

Further, for both declared and inferred compound object profiles, when computing the attribute valuations for the compound object profile, there is no effect on the individually transacted object profiles, or the member object profiles, in one embodiment. That is, the profile that is updated is that associated with the compound object profile.

In embodiments, compound objects and corresponding profiles are used for purposes of analysis, including matching and/or targeting between one or more objects. The compound objects and their corresponding profiles are treated in the same manner as individual objects and object profiles, such as, when performing updating of profiles, and matching profiles between one or more objects.

For example, for declared compound object profiles, one practical application used for determining recommendations includes assessing whether a video asset (e.g., film) is a good match for a family, comprising a declared compound object, to view. In another example, another practical application includes assessing whether a person (e.g., an individual object) is a good match for a particular playlist (a compound object comprising one or more video assets).

A practical application for an inferred compound object profile is illustrated in an example of the creation of a content feed (e.g., newsfeed) that appeals to a particular type of individual that is defined by a desired object profile. The inferred compound object profile includes members that would possibly be interested in viewing the content feed.

In another embodiment, compound objects (e.g., declared or inferred) are compared against other compound objects. In this manner, a practical application includes assessing whether a particular newsfeed (e.g., an inferred compound object) is a good match for a particular family (e.g., declared compound object).

Matching Objects in a System Including Symmetrical Object Profiling

Various analytics are performed once object profiles are established and/or generated within a system comprising a plurality of objects associated with a plurality of symmetrical object profiles, each with varying attribute valuations. For instance, matching between one or more objects in the system is performed based on attribute valuations in the object profiles.

Figure 12:
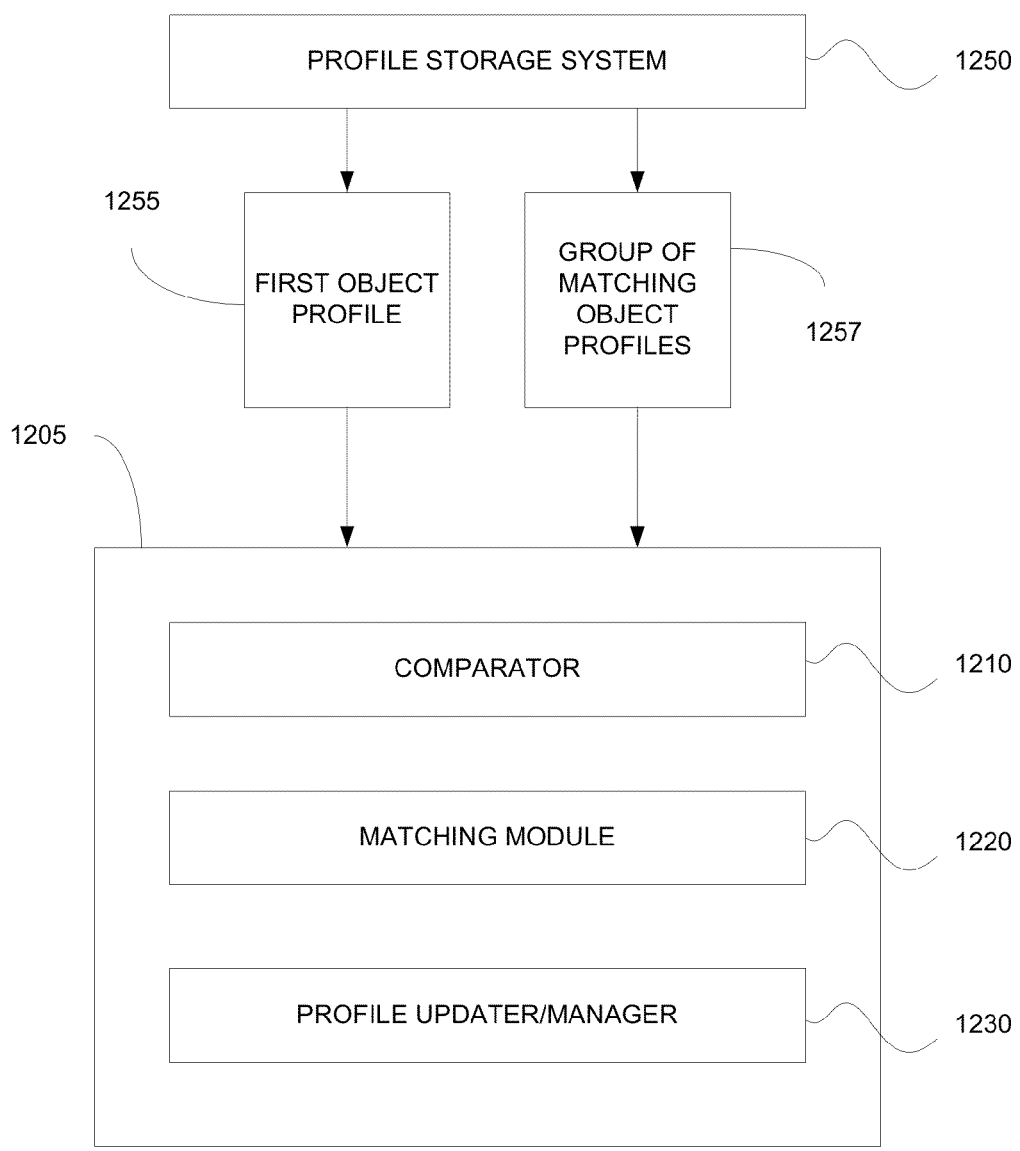
FIG. 12 is a block diagram of a matching system configured to match objects in a object profiling system implementing symmetrical object profiles across one or more objects, in accordance with one embodiment of the present disclosure.

FIG. 12 is a block diagram of a system 1200 configured to match objects that are associated with symmetrical object profiles, in accordance with one embodiment of the present disclosure. That is, system 1200 is implemented within a profiling system that includes a plurality of objects associated with symmetrical object profiles (e.g., sharing the same set of attributes) having different attribute valuations across the object profiles. In addition, the plurality of objects are comprised of a plurality of types of objects, all based on the same symmetrical object profiling system.

As shown in FIG. 12, system 1200 is used for matching one or more objects together and includes a profile storage system 1250 that stores a plurality of object profiles. For instance, the profile storage system stores a first object profile 1255 that is associated with a first object. The first object profile 1255 comprises a first set of valuations for the set of attributes associated with the symmetrical object profiles. In some embodiments, the first object profile comprises a compounded group profile.

In addition, the profile storage system 1250 also includes a group of matching object profiles 1257 that is associated with a group of matching objects. The group of matching object profiles is a subset of and selected from the plurality of symmetrical object profiles supported by the profiling system that includes a plurality of objects. The group of matching object profiles is selected for purposes of matching. For instance, the group of matching object profiles may be associated with a group of assets (e.g., advertisements, video assets, etc.), each of which is capable of being matched to the first object.

Embodiments of the present invention provide for selecting the best matching object for matching with any object (e.g., the first object). In some embodiments, one of the group of matching objects comprises a compounded group profile.

Also shown in FIG. 12 is a matching system 1205 that is configured to match one or more objects together. In particular, matching system 1205 includes a comparator 1210, a matching module 1220, and a profile updater/manager 1230. For example, comparator 1210, compares attributes in the first set of attribute valuations for the first object against and/or with attributes in corresponding matching object profiles associated with the plurality of matching objects. A comparison is made between the respective object profiles to determine a relationship between the first object and each of the matching objects based on object profiling.

Further, matching system 1205 includes a matching module 1220 that is configured for determining a first matching object profile comprising attributes closes to the first set of valuations for the first object. The matching module 1220 also matches the first object to the first matching object based on which matching object profile has the closest relationship with the first object based on attribute valuations in both symmetrical object profiles.

System 1205 also includes a profile updater/manager 1230 that is capable of first generating an object profile, and then updating that object profile with each transaction involving the object and other objects in the system of symmetrical object profiling. In particular, as previously described, object profiles are symmetrical across the plurality of objects comprising various types in the matching system that facilitates matches between objects. In addition, the profile updater/manager 1230 is configured to update object profiles that are involved in a transaction, such that both object profiles reflect the interaction between the two objects. In that manner, closer relationships between objects can be realized in order to achieve better matching of objects. More particularly, profile updater/manager 1230 is configured to update attribute valuations in respective object profiles involved in a transaction, as previously described in relation to FIGS. 4-6 and 7A-C.

Figure 13:
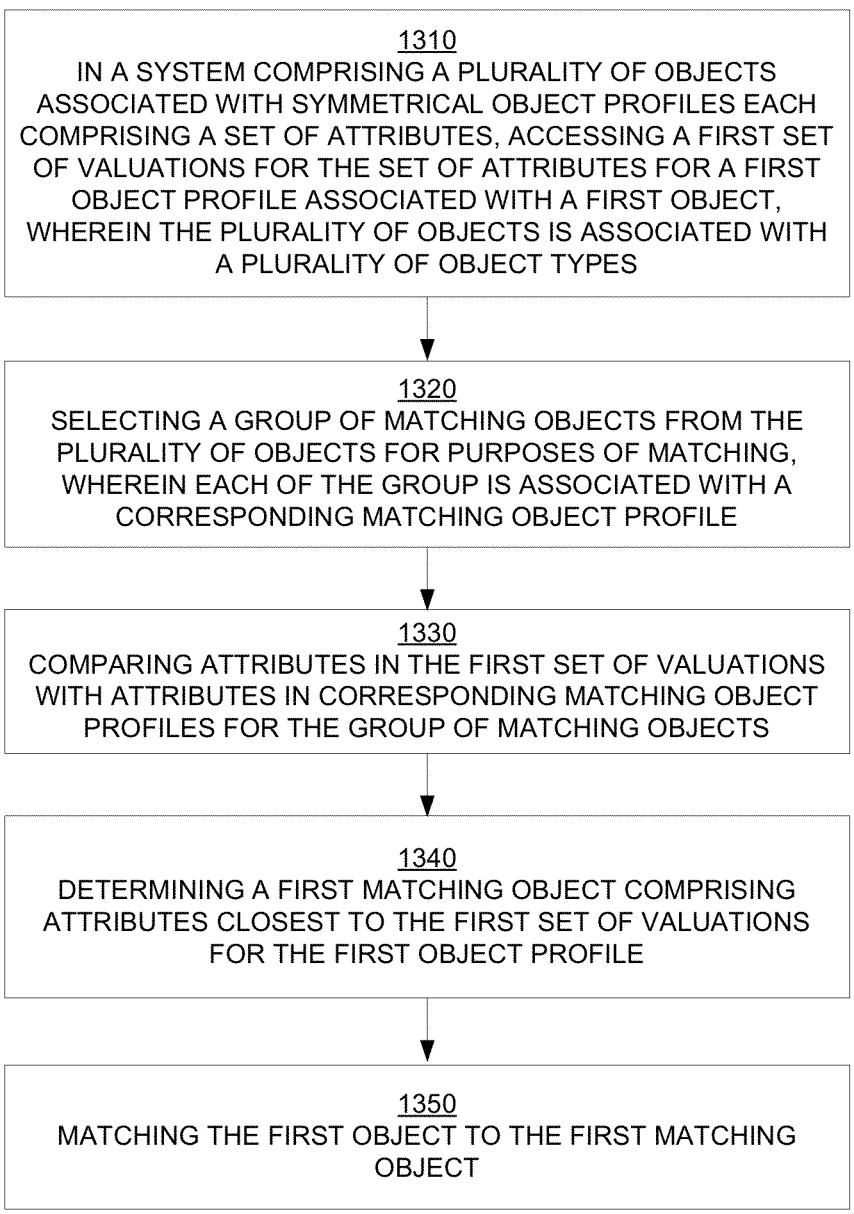
FIG. 13 is a flow chart illustrating a method for matching objects in a system implementing symmetrical object profiles across one or more objects, in accordance with one embodiment of the present disclosure.

FIG. 13 is a flow chart 1300 illustrating a method for matching objects in a system implementing symmetrical object profiles across one or more objects, in accordance with one embodiment of the present disclosure. In one embodiment, flow diagram 1300 is implemented within a computer system including a processor and memory coupled to the processor and having stored therein instructions that, if executed by the computer system causes the system to execute a method for matching objects in a system implementing symmetrical object profiles across one or more objects. In still another embodiment, instructions for performing a method are stored on a non-transitory computer-readable storage medium having computer-executable instructions for causing a computer system to perform a method for matching objects in a system implementing symmetrical object profiles across one or more objects. The method outlined in flow diagram 1300 is implementable by one or more components of the computer system 100, and profile managers/updaters of system 200, 300, and 1200 of FIGS. 2, 3, and 12 respectively.

The method outlined in FIG. 13 is implemented to match objects in a profiling system comprising a plurality of objects associated with symmetrical object profiles, each comprising a set of attributes. Additionally, the plurality of objects is associated with a plurality of object types.

In particular, at 1310, the method includes accessing and/or receiving a first set of valuations for the set of attributes for a first object profile. The first object profile is associated with a first object of a first object type. For instance, for purposes of illustration, the first object is associated with an individual, and the first object type comprises a user. In another instance, for purposes of illustration, the first object and object type is associated with an asset (e.g., an advertisement, or video asset).

At 1320, the method includes selecting a group of matching objects from the plurality of objects for purposes of matching. Each of the group is associated with a corresponding matching object profile. For instance, for illustration purposes only members of the group of matching objects may include advertisements, video assets, or users, and/or subgroups of objects that each are selectable as being a match for the first object based on the closeness of the relationship between object profiles.

More specifically, at 1330, the method includes comparing attributes in the first set of valuations associated with the first object profile, with attributes in corresponding matching object profiles for the group of matching objects. That is, for a particular matching object profile, attributes valuations for each valuation in the symmetrical object profiles are compared.

In one embodiment, attribute comparison is performed for each of the group of matching objects, such that attributes are compared between the first object profile and each matching object profile. The comparison includes determining a second set of valuations for the set of attributes for a corresponding matching object profile. The matching object profile includes the same attributes as found in the first object profile.

Further, for each attribute in the set of attributes, a variance is determined between a first valuation associated with the first object profile, and a second valuation associated with the corresponding matching object profile. That is, the variance is determined by subtracting the second valuation from the first valuation. In one embodiment, the variance calculated is an absolute value of the difference between the second valuation from the first valuation.

At 1340, the method includes determining a first matching object comprising attributes that are closest to the first set of valuations for attributes in the first object profile. In particular, for each of the group of matching objects, a plurality of total variances is determined that is associated with the plurality of matching object profiles. That is, each total variance corresponds to a matching object and the variances determined between attribute valuations between the first object profile and the corresponding matching object profile.

In one embodiment, the total variance for a corresponding matching object profile is determined by totaling variances across the set of attributes. That is, absolute values for variances for corresponding attributes in the set of attributes, as determined from valuations found in the first object profile and the corresponding matching object profile, are summed to determine the total variance for a corresponding matching object profile. In that manner, the total variance is determined for every matching object profile in the group.

In one embodiment, the first matching object is determined by selecting the least total variance from the plurality of total variances associated with the group of matching object profiles. The least total variance is associated with the first matching object, such that the first object and the first matching object are matched together at 1350 based because the first object has the closest relationship with the first matching object in comparison to other matching objects in the group.

FIG. 14 is a Table 1400 illustrating the determination of variances between attribute values for corresponding object profiles when matching a first object to one or more objects in a group of matching objects, in accordance with one embodiment of the present disclosure. Objects illustrated in Table 1400 are implemented within an object profiling system that implements a symmetrical object profile for a plurality of objects. For example, the first object comprises a consumer (e.g., Consumer A), and the group of matching objects comprises Products X, Y, and Z.

Each of the objects (e.g., Consumer A, and Products X-Z) is associated with symmetrical object profiles each comprising a set of attributes, but having possibly different valuations for each attribute. For example, the symmetrical object profile for the profiling system includes one or more attributes associated defined by the attribute column 1410, each defining a particular characteristic. Attributes are further grouped into one or more categories, as defined by category column 1405. For instance, for purposes of illustration only, categories in the declared compound object profile include those describing or defining gender, age, and movie genre. Other groupings of the same or different categories and/or attributes may define other declared compound object profiles.

In addition, valuations for each attribute in their various categories for the various objects are also provided in Table 1400. For instance, attribute valuations for the object comprising Consumer A is provided in column 1420. Also, attribute valuations for the object comprising Product X is provided in column 1430, Product Y is provided in column 1440, and Product Z is provided in column 1450.

Also, variances are determined for each attribute found in object profiles for the Consumer A object profile and for object profiles for Products X-Z. For example, a variance for a corresponding attribute is calculated between a first valuation for the attribute associated with the Consumer A object profile in column 1420 (e.g., a first object) and a second valuation for the same attribute associated with the matching object profile for Product X in columns 1460. As shown in FIG. 14, the variance for the male attribute as determined between Consumer A and product X is 0.129 located in entry 1461. In particular, the variance is determined by taking the difference between the first valuation (e.g., 0.596 located in entry 1421) and the second valuation (e.g., 0.467 located in entry 1431). In one embodiment, the variance is calculated as an absolute value.

In addition, a total variance, or cumulated variance is determined for each of the objects in the group of matching objects. For instance, the attribute variances in association with Product X are provided in column 1460. The total variance is provided by summing the variances determined for each of the attributes associated with the symmetrical object profile. As such, the total variance for Product X is 2.618 located at the bottom of column 1460, the total variance for Product Y is 2.006 located at the bottom of column 1470, and the total variance for Product Z is 2.428 located at the bottom of column 1480.

In one embodiment, the matching object in the group of matching objects is determined by the least total variance. In the example shown in FIG. 14, the least total variance is associated with Product Y with a total variance of 2.006.

In one embodiment, the selection of the first matching object is received and indicates a transaction between the first object and the first matching object. For instance, the first object may comprise a user, and the first matching object a video asset. When the user selects the first matching object, that selection is forwarded to a profile updater/manager. In this case, the first object profile comprises a first set of valuations for the set of attributes, and the first matching object comprises a second set of valuations for the set of attributes. The first object profile is updated based on the second set of valuations for the matching object profile. Also, the first matching object profile is based on the first set of valuations for the first object profile. In that manner, both object profiles are updated to reflect the interaction and transaction between the first object and the first matching object. In one embodiment, the updating of profiles is described in relation to FIGS. 4-6 and 7A-C.

In another embodiment, the first object is configured as a group of one or more objects, wherein each object in the group is associated with a corresponding object profile. As such, the first object is a compound object, such as, a declared (e.g., members of a family) or inferred compound object (e.g., as determined from a desired object profile). The corresponding object profile is based on transactions between objects and members of the group, as previously described in relation to FIGS. 8, 9A-C, 10, and 11A-B. For instance, for a declared compound object, attribute valuations are determined based on attribute valuations from transacted object profiles involved in transactions with members in the group. For an inferred group, attribute valuations are determined by the process outlined in FIG. 10, such as, the following: establishing a desired compound object profile associated with desired attribute values for the set of attributes associated with a symmetrical object profile; specifying a size of the inferred group; determining a plurality of member object combinations satisfying the size and formed from the plurality of objects, each of which is associated with a corresponding member object combination profile; for each of the plurality of member object combinations, determining a second set of valuations for the set of attributes for a corresponding member object combination profile; for each attribute in the set of attributes, determining a variance between a first valuation associated with the desired compound object profile and a second valuation associated with the corresponding member object combination profile, wherein the variance comprises an absolute value; and determining a plurality of total variances by totaling variances for the set of attributes as determined for each of the plurality of member object combination profiles; determining a least total variance that is associated with a first member object combination; and selecting the first member object combination as the inferred group.

In another embodiment, the first matching object in the group of matching objects comprises a subgroup of one or more objects from the plurality of objects. Each object in the subgroup is associated with a corresponding object profile. A first matching object profile is configured based on transaction conducted with members of the group, as previously described. For instance, the subgroup may include a plurality of advertisements, or video assets, that as a group is being marketed or targeted to consumers based on the matching methodologies provided in embodiments of the present invention. As such, in a match between a first object and the first matching object comprising a subgroup of matching objects, transactions are possible between the first object and each of the objects in the subgroup of matching objects.

Thus, according to embodiments of the present disclosure, systems and methods are described for matching objects together in a system implementing symmetrical object profiles across one or more objects, wherein an object profile is influenced by other object profiles with which it interacts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A non-transitory computer-readable medium having computer executable instructions for performing a computer-implemented method for matching, wherein said method comprises:
    accessing a first set of valuations stored in memory resident on a computer system for a set of attributes for a first object profile associated with a first object in a system comprising a plurality of objects associated with symmetrical object profiles each comprising a same set of attributes with said first object profile, wherein said plurality of objects is associated with a plurality of object types;
    selecting a group of matching objects from said plurality of objects for purposes of matching, wherein each matching object of said group of matching objects is associated with a corresponding matching object profile;
comparing attributes in said first set of valuations with attributes in corresponding matching object profiles for said group of matching objects;
determining a first matching object comprising attributes closest to said first set of valuations for said first object profile;
matching said first object to said first matching object;
configuring said first object as a group of one or more objects, wherein each object in said group is associated with a corresponding object profile; and
configuring said first object profile based on transactions between objects with said group of one or more objects, wherein said group of one or more objects comprises a declared group that is associated with a compounded object profile comprising attribute valuations based solely on attribute valuations from transacted object profiles.

2. The non-transitory computer-readable medium of claim 1, wherein in said method said comparing attributes comprises for each of said group of matching objects:
determining a second set of valuations for said set of attributes for a corresponding matching object profile; and
for each attribute in said set of attributes, determining a variance between a first valuation associated with said first object profile and a second valuation associated with said corresponding matching object profile, wherein said variance comprises an absolute value.

3. The non-transitory computer-readable medium of claim 2, wherein in said method said determining a first matching object further comprises for each of said group of matching objects:
determining a plurality of total variances associated with said plurality of matching object profiles by totaling variances for said set of attributes as determined for each of said plurality of matching object profiles;
selecting the least total variance that is associated with said first matching object.

4. The non-transitory computer-readable medium of claim 1, wherein in said method said first object is of a first type of object, and wherein a first matching object is of a second type of object.

5. The non-transitory computer-readable medium of claim 1, wherein said method further comprises:
receiving a selection of said first matching object indicating a transaction between said first object and said first matching object, wherein a first matching object profile comprising a second set of valuations is associated with said first matching object;
updating said first object profile based on said second set of valuations; and
updating said first matching object profile based on said first set of valuations for said first object profile.

6. The non-transitory computer-readable medium of claim 5, wherein said method further comprises:
updating a first attribute of said first object profile by averaging valuations for said first attribute associated with a history of transactions involving said first object that is based on a total number of transactions in said history of transactions.

7. The non-transitory computer-readable medium of claim 1, wherein said group of one or more objects comprises an inferred group that is associated with a compounded object profile comprising said first set of valuations, wherein said method further comprises:

establishing a desired compound object profile associated with desired attribute values for said set of attributes;
specifying a size of said inferred group;
determining a plurality of member object combinations satisfying said size and formed from said plurality of objects, each of which is associated with a corresponding member object combination profile;
for each of said plurality of member object combinations, determining a second set of valuations for said set of attributes for a corresponding member object combination profile;
for each attribute in said set of attributes, determining a variance between a first valuation associated with said desired compound object profile and a second valuation associated with said corresponding member object combination profile, wherein said variance comprises an absolute value; and
determining a plurality of total variances by totaling variances for said set of attributes as determined for each of said plurality of member object combination profiles;
determining a least total variance that is associated with a first member object combination; and
selecting said first member object combination as said inferred group.

8. The non-transitory computer-readable medium of claim 7, wherein said determining a second set of valuations for said set of attributes for a corresponding member object combination profile comprises attribute valuations based solely on attribute valuations from transacted object profiles.

9. The non-transitory computer-readable medium of claim 1, further comprising: facilitating a transaction between each of said group of one or more objects and said first matching object.

10. The non-transitory computer-readable medium of claim 1, wherein one of said group of matching objects comprises an advertisement.

11. The non-transitory computer-readable medium of claim 1, wherein said selecting a group of matching objects in said method further comprises:
configuring said first matching object as a subgroup of one or more objects from said plurality of objects, wherein each object in said subgroup is associated with a corresponding object profile; and
configuring a first matching object profile of said first matching object based on object profiles of objects in said subgroup.

12. The non-transitory computer-readable medium of claim 11, further comprising:
facilitating a plurality of transactions between each of said subgroup and said first object.

13. A system for matching, comprising:
a profile updater for managing one or more of a plurality of symmetrical object profiles associated with a plurality of objects, each of said plurality of symmetrical object profiles comprising a same set of attributes, and wherein said plurality of objects is associated with a plurality of object types;
a first object profile comprising a first set of valuations for said same set of attributes associated with each of said plurality of symmetrical object profiles, and associated with a first object of a first object type, wherein said first object is configured as a group of one or more objects, wherein each object in said group is associated with a corresponding object profile, wherein said first object profile is configured based on transactions between objects with said group of one or more objects, wherein said group of one or more objects comprises a declared group that is associated with a compounded object profile comprising attribute valuations based solely on attribute valuations from transacted object profiles;

a group of matching object profiles selected from said plurality of symmetrical object profiles and associated with a group of matching objects for purposes of matching, wherein at least one matching object is comprised of a second object type;

a comparator for comparing attributes in said first set of valuations with attributes in corresponding matching object profiles for said plurality of matching objects;

a matching module for determining a first matching object profile comprising attributes closest to said first set of valuations for said first object profile and for matching said first object to said first matching object.

14. The system of claim 13, further comprising:

a storage system for storing one or more of said plurality of symmetrical object profiles.

15. The system of claim 13, wherein said comparator determines a second set of valuations for said set of attributes for a corresponding matching object profile, and for each attribute in said set of attributes, determines a variance between a first valuation associated with said first object profile and a second valuation associated with said corresponding matching object profile.

16. The system of claim 15, wherein said matching module determines a plurality of total variances associated with said plurality of matching object profiles by totaling variances for said set of attributes as determined for each of said plurality of matching object profiles, and selects the least total variance that is associated with said first matching object.

17. The system of claim 13, further comprising:

a profile updater for updating said first object profile based on said second set of valuations, and updating said first matching object profile based on said first set of valuations, when a transaction occurs between said first object and said first matching object.

18. The system of claim 13, wherein wherein at least one of said group of matching objects comprises a video asset.

19. The system of claim 13, wherein said first matching object comprises a subgroup of one or more objects from said plurality of objects, wherein each object in said subgroup is associated with a corresponding viewer, and wherein said first object comprises a video asset.

20. A computer-implemented method for matching, comprising:

in a system comprising a plurality of objects associated with symmetrical object profiles each comprising a same set of attributes with a first object profile, accessing from memory a first set of valuations for said same set of attributes for said first object profile associated with a first object, wherein said plurality of objects is associated with a plurality of object types;

selecting a group of matching objects from said plurality of objects for purposes of matching, wherein each matching object of said group of matching objects is associated with a corresponding matching object profile;

at a comparator, comparing attributes in said first set of valuations with attributes in corresponding matching object profiles for said group of matching objects;

determining a first matching object comprising attributes closest to said first set of valuations for said first object profile;

matching said first object to said first matching object configuring said first object as a group of one or more objects, wherein each object in said group is associated with a corresponding object profile; and configuring said first object profile based on transactions between objects with said group of one or more objects, wherein said group of one or more objects comprises a declared group that is associated with a compounded object profile comprising attribute valuations based solely on attribute valuations from transacted object profiles.

21. The method of claim 20, wherein said comparing attributes comprises for each of said group of matching objects:

determining a second set of valuations for said set of attributes for a corresponding matching object profile; and for each attribute in said set of attributes, determining a variance between a first valuation associated with said first object profile and a second valuation associated with said corresponding matching object profile, wherein said variance comprises an absolute value.

22. The method of claim 21, wherein said determining a first matching object further comprises for each of said group of matching objects:

determining a plurality of total variances associated with said plurality of matching object profiles by totaling variances for said set of attributes as determined for each of said plurality of matching object profiles;

selecting the least total variance that is associated with said first matching object.

* * * * *